US010527783B2

(12) United States Patent
Badding et al.

(10) Patent No.: US 10,527,783 B2
(45) Date of Patent: Jan. 7, 2020

(54) TRANSITION METAL DOPED ZINC SELENIDE OPTICAL FIBERS AND METHODS FOR MAKING THE SAME

(71) Applicant: The Penn State Research Foundation, University Park, PA (US)

(72) Inventors: John V. Badding, State College, PA (US); Justin R. Sparks, Coopersburg, PA (US)

(73) Assignee: THE PENN STATE RESEARCH FOUNDATION, University Park, PA (US)

( * ) Notice: Subject to any disclaimer, the term of this patent is extended or adjusted under 35 U.S.C. 154(b) by 0 days.

(21) Appl. No.: 15/679,351

(22) Filed: Aug. 17, 2017

(65) Prior Publication Data
US 2018/0095220 A1 Apr. 5, 2018

Related U.S. Application Data

(60) Provisional application No. 62/376,080, filed on Aug. 17, 2016.

(51) Int. Cl.
G02B 6/02 (2006.01)
C03C 3/32 (2006.01)
C03C 13/04 (2006.01)
G02B 13/14 (2006.01)

(52) U.S. Cl.
CPC .......... G02B 6/02395 (2013.01); C03C 3/321 (2013.01); C03C 13/043 (2013.01); C03C 3/32 (2013.01); G02B 13/14 (2013.01)

(58) Field of Classification Search
None
See application file for complete search history.

(56) References Cited

U.S. PATENT DOCUMENTS 8,934,748 B2 * 1/2015 Rice .................... C03B 37/0235
385/123
2011/0038587 A1 * 2/2011 Shaw .................... C03B 37/023
385/127
2011/0103756 A1 5/2011 Rice et al.

OTHER PUBLICATIONS

Berry, Patrick A.; "Versatile Chromium Zinc Selenide Infrared Laser Sources"; May 2010; Air Force Research Labratory, Sensor Directorate; pp. i-60 (Year: 2010).*
Sparks, et al. (2011) "Zinc Selenide Optical Fibers", Adv. Mater., vol. 23, pp. 1647-1651.
Vukovic, et al. (2015) "Tunable continuous wave emission via phase-matched second harmonic generation in a ZnSe microcylindrical resonator", Nature/Scientific reports, vol. 5, 11798, pp. 1-9.
Macdonald, et al. (2013) "Efficient mid-infrared Cr: ZnSe channel waveguide laser operating at 2486 nm", Optics Letters, vol. 38, pp. 2194-2196.

* cited by examiner

*Primary Examiner* — Jerry Rahll
(74) *Attorney, Agent, or Firm* — Riverside Law LLP

(57) ABSTRACT

The invention relates to $Cr^{2+}$:ZnSe core optical fibers and methods of fabricating thereof, including a hybrid physical-chemical vapor deposition reaction. The invention relates also to $Cr^{2+}$:ZnSe optical fiber lasers, in particular to a crystalline semiconductor optical fiber laser.

13 Claims, 10 Drawing Sheets

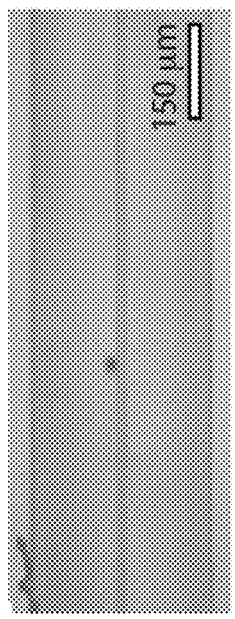
Fig. 1A
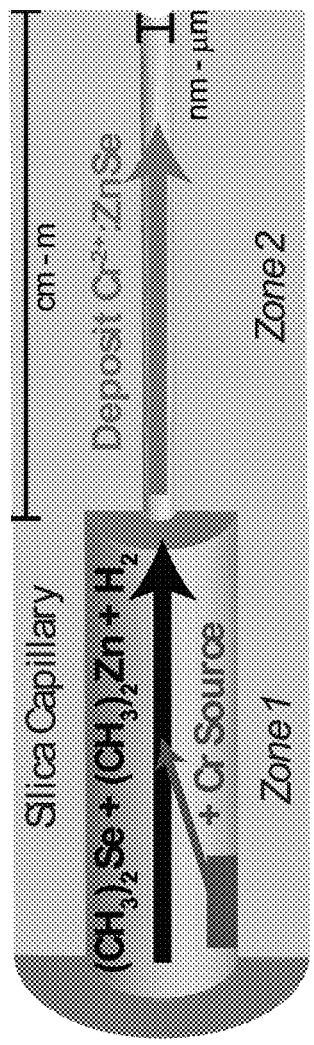
Fig. 1B
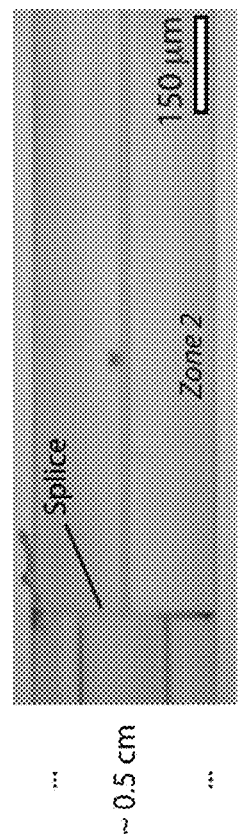
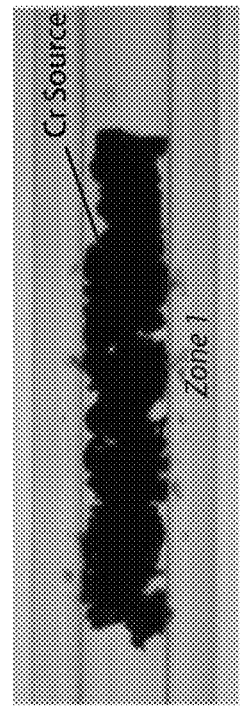
Fig. 1C
Fig. 1

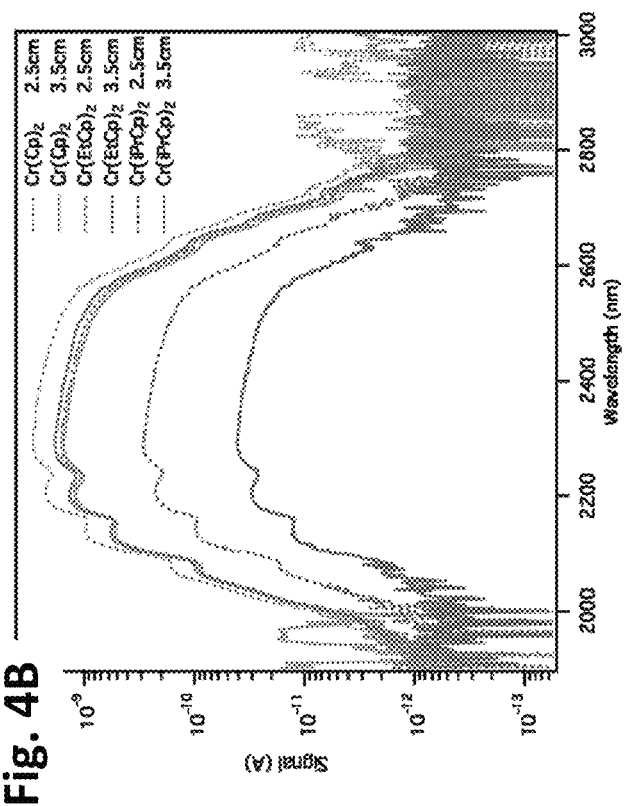
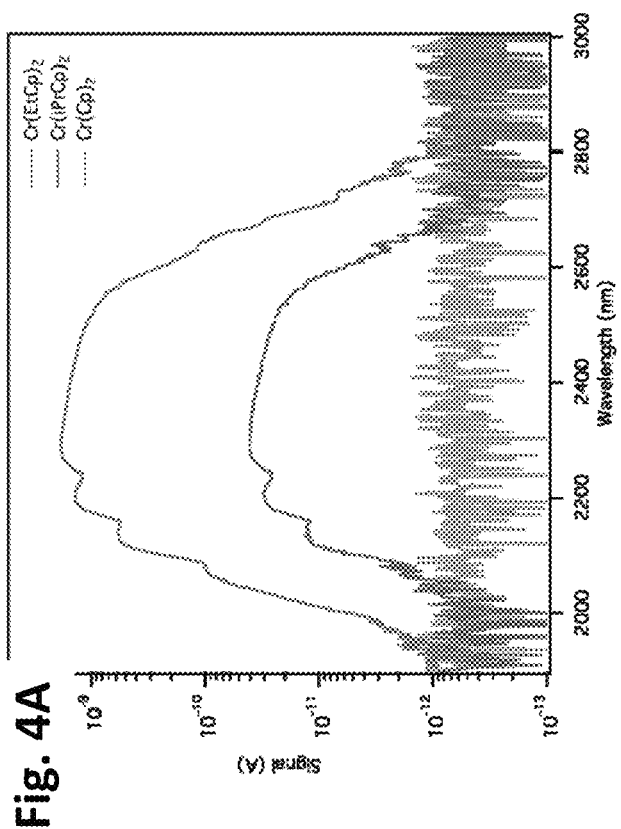
Fig. 4A
Fig. 4B
Fig. 4

TRANSITION METAL DOPED ZINC SELENIDE OPTICAL FIBERS AND METHODS FOR MAKING THE SAME

CROSS-REFERENCE TO RELATED APPLICATIONS

This application claims priority to U.S. Patent Application Ser. No. 62/376,080, filed Aug. 17, 2016, the entire contents of which are incorporated herein by reference.

STATEMENT REGARDING FEDERALLY SPONSORED RESEARCH OR DEVELOPMENT

This invention was made with government support under Grant No. DMR0806860, awarded by the National Science Foundation, Contract No. FA8650-10-C-1902, awarded by the Air Force Material Command LO/JAZ, and Grant Nos. FA8650-10-f-1902 and FA8650-13-2-1615, awarded by the U.S. Air Force Research Laboratory. The Government has certain rights in the invention.

BACKGROUND OF THE INVENTION

The optical fiber geometry is unique, combining micrometer to nanometer scale transverse dimensions with kilometer scale axial dimensions (Russell, P. Photonic Crystal Fibers: A Historical Account. *IEEE Lasers and Electro-Optics Soc.* 21, 2007). Arranging materials in such geometries offers interesting opportunities to exploit very weak effects in materials due to the extremely long interaction lengths of photons and electrons. Silica-based optical fiber waveguides are ubiquitous in transmitting light over long distances for the flexible delivery of optical power in technologies such as communication, surgery, and sensing due to their high purity, mechanical strength, and uniform, smooth structure (Gambling, W. A. The Rise and Rise of Optical Fibers. *IEEE Journal on Selected Topics of Quantum Electronics* 6, 2000). Silica optical fiber lasers have emerged as compact, rugged, stable, and very high power sources of both continuous wave and ultrafast near-infrared light and are preferred for many applications. These advantages could be extended into other wavelength domains if fiber lasers could be fabricated out of a range of materials beyond silica and other glasses. In contrast to silica, many II-VI compound semiconductors have transmission windows that extend much farther into the IR making them very useful for applications such as chemical and thermal sensing, infrared countermeasures, stand-off detection of explosives, and nonlinear optics (Méndez, J. A. & Morse, T. F. *Specialty Optical Fibers Handbook*, Elsevier, 2006; Harrington, J. A. *Infrared Fibers and Their Applications*, SPIE, 2004). However, fabricating optical fibers out of crystalline laser gain media has proven to be challenging using conventional fiber drawing techniques.

Semiconductor optical gain media such as $Cr^{2+}$-doped zinc selenide ($Cr^{2+}$:ZnSe) and related crystalline transition metal-doped II-VI chalcogenides in particular are very attractive for efficient infrared lasers tunable in the technologically important 2 to 5 µm mid-infrared region of the spectrum. $Cr^{2+}$:ZnSe lasers share many desirable characteristics with Ti-Sapphire lasers, a preferred source for a very wide range of continuous wave (CW) and pulsed applications, but emit in the technologically important 2-3 µm mid-infrared region of the spectrum rather than in the red and near-infrared. In particular, $Cr^{2+}$ does not exhibit any excited state spin allowed transitions and the matrix ZnSe has a low phonon frequency of 250 $cm^{-1}$, which allows for the highest quantum yield known for the 2-3 µm mid-infrared region, near continuous vibronic emission, and room temperature operation (Kueck, in *International Conference on Lasers, Applications, and Technologies* 2002, Vol. 57, SPIE, Moscow 2003). $Cr^{2+}$:ZnSe also exhibits the broadest gain known, making it potentially very attractive for ultrafast applications. Lasers operating in the 2-3 µm wavelength range of $Cr^{2+}$:ZnSe and the 3.7-5.1 µm wavelength range of the closely related $Fe^{2+}$:ZnSe materials are sought after for chemical detection, biomedicine, infrared countermeasures, and astronomical applications. High power ultrafast $Cr^{2+}$:ZnSe lasers could enable scaling of coherent high harmonically generated sources further into the soft x-ray regime, as the cutoff frequency varies with the inverse square of the pump frequency. Additionally, changing the crystalline lattice can alter the crystal field splitting to allow for more tunability (e.g. 1.9-2.8 µm in $Cr^{2+}$:ZnS; Moskalev, et al., Optics express 17, 2048-2056, 2009) and several other useful transition metal chalcogenide gain media are known.

However, $Cr^{2+}$:ZnSe based bulk lasers are plagued by thermal effects due to their large thermo-optic coefficient ($dn/dT=70\times10^{-6}$ $K^{-1}$ for ZnSe; Sorokina, Optical Materials 26, 395, 2004). This gives rise to thermal lensing, which has limited the power of CW lasers that use static bulk gain media to 14 W (Berry, et al., Optics express 18, 15062-15072, 2010; Schepler, et al., IEEE Journal of Selected Topics on Quantum Electronics 11, 2005). Configurations that require movement of the gain media in a high Q cavity to ameliorate thermal lensing are awkward for applications such as those on aircraft and many more. High surface area to volume ratio geometries that facilitate heat removal are therefore of interest for power scaling $Cr^{2+}$:ZnSe lasers up to the levels needed for many applications.

Optical fibers in particular are less susceptible to thermal lensing effects because of their long, small diameter cores that radiate heat much more effectively than bulk optics. Additionally, thermo-optic induced changes in refractive index do not alter their light guiding properties significantly because the mode of the laser is determined by the mode structure of the waveguide. Heat arising from light absorption and/or quantum defects in fiber laser gain media is radiated equally well over 360 degrees of cross sectional angle; the large surface area-to-volume ratio and long length of the fiber also facilitates management of this heat. The long length of an optical fiber allows for lower concentrations of active ions to be used, while still efficiently absorbing all of the pump light, which reduces the thermal load per unit length on the fiber. Owing to these effects, many of the most powerful commercially available lasers are fiber lasers (Richardson and Nilsson, Opt. Soc. Am. B 27, 63, 2010). In contrast, planar ZnSe waveguides fabricated by a variety of methods are also in general less susceptible to thermal lensing, but lack the circular cross sections favorable to uniform heat radiation and polarization independent guidance. In general, fibers are also noted for higher power handling capabilities in comparison with planar waveguides and can be coupled much more easily to other fibers and fiber devices, thus enabling all-fiber optoelectronics. Encapsulating the ZnSe fiber core into a flexible, strong silica fiber cladding makes it less susceptible to chemical, mechanical, or thermal degradation. Hybrid physical-chemical vapor deposition (HPCVD) is a scalable process that can be used to fabricate many semiconductor fibers with lengths from centimeters to tens of meters in parallel. Competing approaches such as pedestal growth are not viable for chalcogenides such as ZnSe and are not as scalable as fiber drawing or HPCVD.

$Cr^{2+}$:ZnSe fiber lasers have been proposed to overcome the previously mentioned difficulties (Martyshkin, et al., Optics Letters 2011, 36; J. B. McKay, in *Engineering*, Air Force Institute of Technology, Dayton, Ohio 2003) but incongruent vaporization of the chalcogen has precluded drawing them at high temperatures. Fabricating optical fibers out of crystalline semiconductor materials using conventional drawing methods poses a significant challenge due to the thermal, chemical, and mechanical materials mismatches of their materials properties with silica. Although some III-V compound semiconductors, such as InSb, can be drawn into optical fibers (Ballato, et al., Optics express 18, 2010), the II-VI semiconductors appear to be among the most challenging materials to form into the optical fiber geometry due to their high vapor pressures and incongruent melting points.

Thus, there is a continuing need in the art for novel materials for fiber optics lasers, in particular transition metal doped semiconductors with uniform doping concentration. There is also a continuing need in the art for novel optic fibers, and fiber optics lasers, in particular $Cr^{2+}$:ZnSe lasers. There is a continuing need in the art for novel methods for fabricating these materials and optic fibers. The present invention addresses these continuing needs in the art.

SUMMARY OF INVENTION

In one aspect, the invention relates to an optical fiber comprising an external silica cladding and a transition metal doped chalcogenide core. In one embodiment, the transition metal is selected from the group consisting of chromium, iron, and manganese. In another embodiment, the transition metal is chromium. In another embodiment, the concentration of transition metal along the length of the core is substantially uniform. In one embodiment, the chalcogenide is a II-VI semiconductor. In another embodiment, the chalcogenide is selected from the group consisting of ZnSe, ZnS, ZnTe, CdSe, CdS, and CdTe. In another embodiment, the chalcogenide is ZnSe. In one embodiment, the cladding and the core have a substantially semi-cylindrical cross section. In another embodiment, the cladding and the core have a substantially D-shaped cross section. In another embodiment, the cladding and the core have a substantially cylindrical cross section. In one embodiment, the diameter of the core is between 1 and 1000 µm. In another embodiment, the diameter of the core is about 15 µm.

In another aspect, the invention relates to a laser comprising an optical fiber comprising an external silica cladding and a transition metal doped chalcogenide core. In one embodiment, the transition metal is selected from the group consisting of chromium, iron, and manganese. In another embodiment, the transition metal is chromium. In another embodiment, the concentration of transition metal along the length of the core is substantially uniform. In one embodiment, the chalcogenide is a II-VI semiconductor. In another embodiment, the chalcogenide is selected from the group consisting of ZnSe, ZnS, ZnTe, CdSe, CdS, and CdTe. In another embodiment, the chalcogenide is ZnSe. In one embodiment, the cladding and the core have a substantially semi-cylindrical cross section. In another embodiment, the cladding and the core have a substantially D-shaped cross section. In another embodiment, the cladding and the core have a substantially cylindrical cross section. In one embodiment, the external diameter of the cladding is between 10 and 1000 µm. In another embodiment, the external diameter of the cladding is about 300 µm. In one embodiment, the diameter of the core is between 1 and 1000 µm. In another embodiment, the diameter of the core is about 15 µm.

In one aspect, the invention relates to a method for fabricating a cladded optical fiber, the method comprising: providing a cladding material having a lumen with proximal and distal openings, wherein the proximal opening of the lumen is connected to a cavity; positioning an organo-transition metal compound in the cavity; passing a mixture comprising an organo-metallic compound, an organo-chalcogen compound, and a reducing agent through the cavity; directing flow of the organo-transition metal and the mixture into the lumen of the cladding; and depositing transition metal doped chalcogenide in the lumen of the cladding. In one embodiment, the organo-metallic compound is selected from the group consisting of an organo-zinc compound, an organo-iron compound, and an organo-manganese compound; the organo-chalcogen is selected from the group consisting of an organo-Se compound, an organo-S compound, and an organo-Te; the reducing agent is hydrogen, and the transition metal is selected from the group consisting of chromium, iron, and manganese. In one embodiment, the organo-zinc compound is dimethyl zinc, and the transition metal is chromium. In another embodiment, the organo-chalcogen compound is dimethyl selenide, and the transition metal is chromium. In one embodiment, the organo-chromium compound is bis(R-cyclopentadienyl) chromium compound, wherein R is selected from the group consisting of H, methyl, ethyl, propyl, isopropyl, butyl, t-butyl, and phenyl.

In one aspect, the invention relates to a method for fabricating a bulk crystalline material, the method comprising the steps of positioning a substrate in a growth chamber; independently providing an organo-metallic compound, an organo-chalcogen compound, an organo-transition metal compound, and a reducing agent into the growth chamber; and depositing a transition metal doped chalcogenide on the substrate. In one embodiment, the organo-metallic compound is selected from the group consisting of an organo-zinc compound, an organo-cadmium compound, and an organo-mercury compound; the organo-chalcogen is selected from the group consisting of an organo-Se compound, an organo-S compound, and an organo-Te compound; the reducing agent is hydrogen; and the organo-transition metal compound is selected from the group consisting of organo-chromium, organo-iron, and organo-manganese.

BRIEF DESCRIPTION OF THE DRAWINGS

The following detailed description of preferred embodiments of the invention will be better understood when read in conjunction with the appended drawings. For the purpose of illustrating the invention, there are shown in the drawings embodiments which are presently preferred. It should be understood, however, that the invention is not limited to the precise arrangements and instrumentalities of the embodiments shown in the drawings.

FIG. 1, comprising FIG. 1A, FIG. 1B, and FIG. 1C, depicts an optic fiber silica cladding, and a schematic and an optical micrograph of in-situ $Cr^{2+}$ doping in an all-fiber reaction vessel. FIG. 1A depicts an optical micrograph of an exemplary embodiment of an optic fiber silica cladding. FIG. 1B includes a schematic illustrating how zone one of a two zone furnace is used to heat a solid or liquid precursor contained in a larger capillary in that is spliced to the targeted deposition capillary in zone two, which is at far higher temperature. The $Cr^{2+}$ precursor is therefore allowed to mix with the ZnSe precursors before reaching the second zone where deposition of $Cr^{2+}$:ZnSe takes place. FIG. 1C is a diascopically illuminated optical micrograph of an example all-fiber deposition apparatus for in-situ $Cr^{2+}$ doping using low vapor pressure precursors. A 150 μm diameter silica capillary containing solid bis(cyclopentadienyl) chromium, $Cp_2Cr$, is spliced to a 15 μm diameter capillary in which deposition will occur. This deposition capillary can be cm to m in length.

FIG. 2A, FIG. 2B, and FIG. 2C, depicts optical and electron micrographs of a $Cr^{2+}$:ZnSe optic fiber, as well as a transmitted optical mode of a $Cr^{2+}$:ZnSe optic fiber laser. FIG. 2A shows a transmitted light optical micrograph along the axial dimension of a $Cr^{2+}$:ZnSe core optical fiber. FIG. 2B is a scanning electron micrograph showing the radial cross-section of the fiber. FIG. 2C depicts the experimental guided optical mode at 1550 nm.

FIG. 4, comprising FIG. 4A and FIG. 4B, are two charts depicting the fluorescence spectra demonstrating the effects of deposition chemistry on dopant concentration, both in intensity and dopant incorporation along the fiber length. FIG. 4A depicts the $Cr^{2+}$:ZnSe fluorescence signal as a function of cyclopentadiene ring substitution at fixed source temperature (150° C.). The precursor with the highest vapor pressure results in the highest fluorescence signal. The solid $Cr(Cp)_2$ source does not produce enough vapor for a measurable doping level.

FIG. 4B depicts the $Cr^{2+}$:ZnSe fluorescence signal as a function of ring substitution on cyclopentadiene ring with the $Cr(EtCp)_2$ and $Cr(iPrCp)_2$ sources at 150° C., and the $Cr(Cp)_2$ source at 225° C. The length difference from the dashed and solid lines of a given sample is ~1 cm.

FIG. 5A includes a schematic depicting an optical cavity fabricated using a $Cr^{2+}$:ZnSe optical fiber of the invention.

versus 1/T for the TGA determination of sublimation/vaporization enthalpies of chromocene derivatives.

Figure 9:
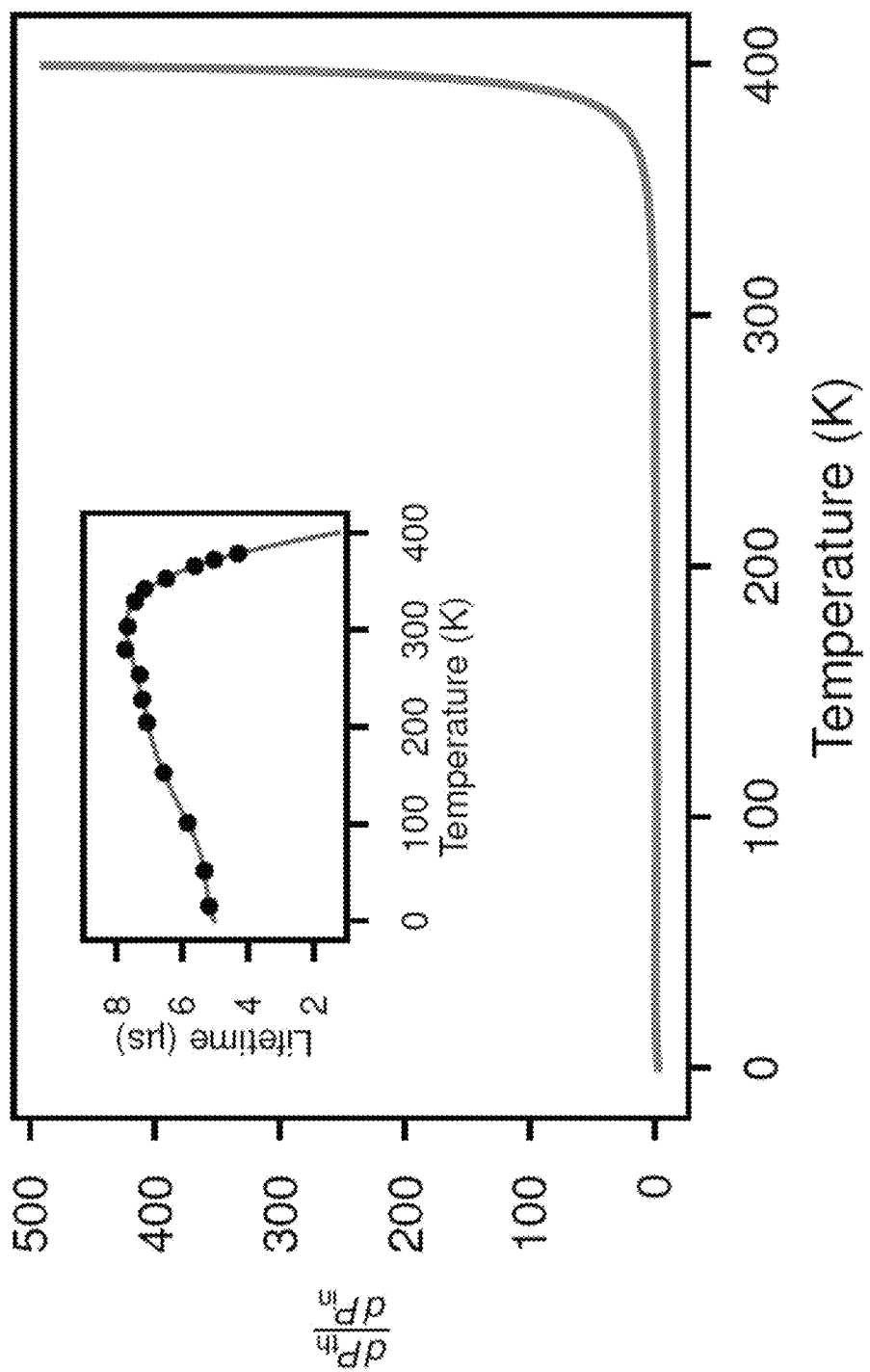

FIG. 9 is a chart depicting the change in lasing threshold power with respect to change in incident pump power as a function of temperature for the waveguide laser clad in diamond. The inset shows the $8^{th}$ order polynomial fit to the experimental data of Deloach et al. used in the calculation.

Figure 10:
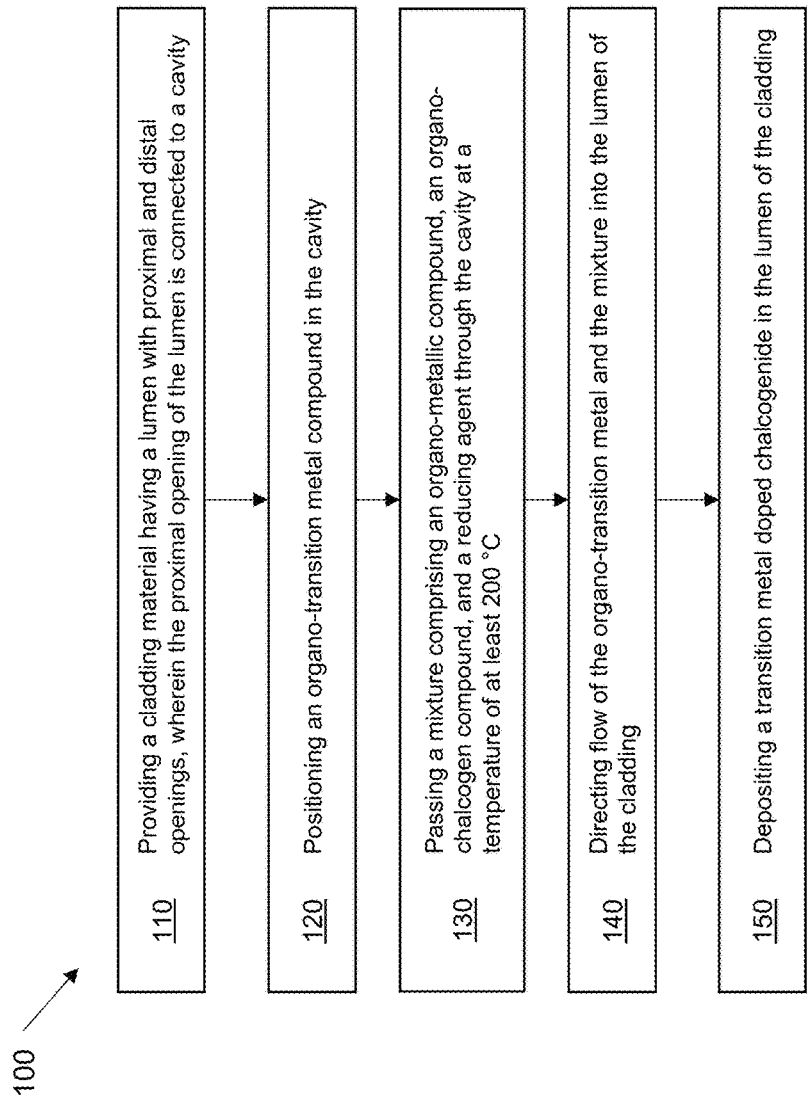

FIG. 10 is a flowchart of an exemplary method for the fabrication of a cladded optical fiber.

DETAILED DESCRIPTION

The invention relates in part to $Cr^{2+}$:ZnSe core optical fibers and methods of fabricating thereof, including a high pressure chemical vapor deposition reaction. $Cr^{2+}$:ZnSe is the only known gain medium to function with a high quantum efficiency in the important wavelength region from 2 to 4 microns, and the in-situ doping methodology described herein allows for achieving a material with uniform doping concentration along optic fibers of centimeter length scales, overcoming a significant technological disadvantage to diffusion doping schemes, which is exacerbated in high aspect geometries. The in-situ methodology includes a novel (HPCVD) reaction utilizing organometallic chromium precursors, which allows for control of the dopant incorporation during material growth. This new chemical approach offers the possibility of uniform doping levels despite the ultra-high aspect ratio of the fiber optics.

The invention relates also to $Cr^{2+}$:ZnSe optical fiber lasers, in particular to a crystalline semiconductor optical fiber laser, i.e., a $Cr^{2+}$:ZnSe fiber laser operating in the gain-switched regime around 2300 nm. The invention relies on $Cr^{2+}$:ZnSe optical fibers which can guide high powers of infrared light, applicable to non-linear frequency conversion and high power fiber lasers.

Definitions

It is to be understood that the figures and descriptions of the present invention have been simplified to illustrate elements that are relevant for a clear understanding of the present invention, while eliminating, for the purpose of clarity, many other elements found in the art related to transition metal doping of chalcogenides, chemical vapor deposition, fiber optics, lasers, in particular fiber optics lasers, and the like. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Unless defined otherwise, all technical and scientific terms used herein have the same meaning as commonly understood by one of ordinary skill in the art to which this invention belongs. Although any methods, materials and components similar or equivalent to those described herein can be used in the practice or testing of the present invention, the preferred methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20%, ±10%, ±5%, ±1%, or ±0.1% from the specified value, as such variations are appropriate.

Throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, 6 and any whole and partial increments therebetween. This applies regardless of the breadth of the range.

Materials and Devices

In one aspect, the invention relates to an optic fiber including an external cladding and an internal core. Optic fibers, including optic fibers with a cladding and a core, have high aspect ratio, i.e., their cross dimensions are in the nanometer to millimeter range, while their axial dimensions, or length, are in the millimeter to kilometer range.

Figure 2:
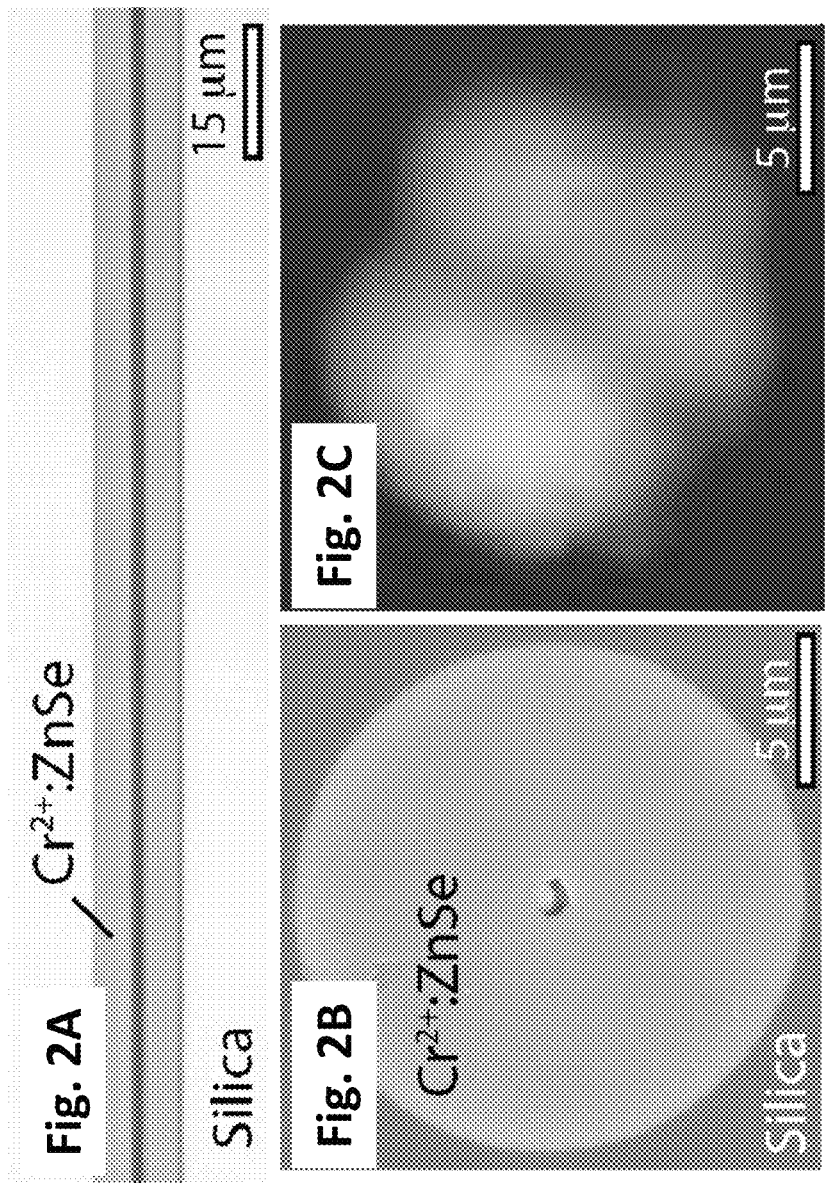
FIG. 2, comprising

As shown in FIG. 1 and FIG. 2, the cladding of an optic fiber of the invention is a substantially cylindrical capillary tube. The optical fiber cladding can be made of any material known to those in the art. Exemplary cladding materials include silicon oxynitride, silica ($SiO_2$), magnesium fluoride, diamond, diamond-like glass (DLG); polymers such as acrylate, polyimide, and hybrid organic/inorganic sol-gel materials, boron- or fluorine-doped $SiO_2$, and the like. In one embodiment, the cladding material is silica. In another embodiment, the cladding material is diamond. In another embodiment, the cladding material is diamond-like glass.

In some embodiment, the cladding is cylindrical in shape (e.g., has a round cross section). In other embodiments, the cladding has a substantially semi-cylindrical or D-shaped cross section. In one embodiment, the thickness of the cladding is at least 1 μm. In one embodiment, the thickness of the cladding is between 1 μm and 10 cm. In one embodiment, the thickness of the cladding is between 1 μm and 1 cm. In one embodiment, the thickness of the cladding is between 1 μm and 500 μm. In one embodiment, the thickness of the cladding is between 1 μm and 250 μm. In one embodiment, the thickness of the cladding is between 1 μm and 100 μm. In one embodiment, the thickness of the cladding is between 1 μm and 50 μm. In one embodiment, the thickness of the cladding is about 1 μm.

The internal core is a continuous opening in the middle section of the cladding, extending through the cladding along a portion of, or its entire length, partially or completely filed with a transition metal doped chalcogenide. While in a certain embodiments the cross section of the core is substantially circular, any other cross sectional shape is are possible, for example and without limitation, semi-cylindrical, D-shaped, ellipsoidal, a triangular, a rectangular, or the like. In some embodiments, the core is co-axial with the cladding. In one embodiment, the interface between the core and the cladding is a gradient between the core material and the cladding material. For example, in one embodiment, the interface between the core and the cladding material is a gradient from 100% cladding material to 100% core material.

In one embodiment, the diameter of the core is between 1 μm and 1000 μm. In one embodiment, the diameter of the core is between 1 μm and 100 μm. In one embodiment, the diameter of the core is between 1 μm and 50 μm. In one embodiment, the diameter of the core is between 5 and 50 μm. In another embodiment, the diameter of the core is about 5 μm. In another embodiment, the diameter of the core is about 10 μm. In another embodiment, the diameter of the core is about 15 μm. In another embodiment, the diameter of the core is about 20 μm. In another embodiment, the diameter of the core is about 25 μm. In another embodiment, the diameter of the core is about 30 μm. In another embodiment, the diameter of the core is about 35 μm. In another embodiment, the diameter of the core is about 40 μm. In another embodiment, the diameter of the core is about 45 μm. In another embodiment, the diameter of the core is about 50 μm.

In one embodiment, a gain medium partially fills the core. Owing to the dynamics of the deposition method used for making the core, which is described elsewhere herein, in one embodiment the gain medium fills most of the core space while leaving a pore in the central region of the core. In one embodiment, the pore in the central medium of the core is between 100 nm and 1000 nm in diameter. In one embodiment, the pore is about 450 nm in diameter.

The gain medium can be any such medium as contemplated by one of ordinary skill in the art. In one embodiment, the gain medium is a chalcogenide. A chalcogenide is a chemical compound comprising at least one chalcogen anion (e.g., sulfur, selenium, tellurium, and polonium) and at least one electropositive element such as a metal, transition metal, or metalloid. In some embodiments, the chalcogenide is a II-VI semiconductor. In other embodiments the chalcogenide can be ZnSe, ZnS, ZnTe, CdSe, CdS, CdTe, HgS, HgSe, or HgTe. In another embodiment, the chalcogenide is selected from the group consisting of ZnO, CdO, and HgO. In one embodiment, the chalcogenide is ZnSe. In another embodiment, the chalcogenide is ZnS. In another embodiment, the chalcogenide is CdS.

In another embodiment, the gain medium is a transition metal doped chalcogenide. In some embodiments the transition metal is selected from groups 4, 5, 6, 7, 8, 9, 10, 11, or 12 of the periodic table of the elements, as would be appreciated by one of skill in the art. In one embodiment, the transition metal has an oxidation state of 0, +1, +2, +3, +4, or mixtures thereof. In one embodiment, the transition metal has an oxidation state of +2. In one embodiment, the transition metal is selected from a group including vanadium, chromium, manganese, iron, cobalt, niobium, molybdenum, technetium, ruthenium, and rhodium, or a combination thereof. In one embodiment, the transition metal can be chromium, iron, or manganese. In one embodiment, the gain medium includes more than one transition metal dopant. In one embodiment, the transition metal is chromium. In one embodiment, the transition metal is chromium (II). In another embodiment, the transition metal is iron. In one embodiment, the transition metal is iron (II). In one embodiment, the gain medium is $Cr^{2+}$:ZnSe. In another embodiment, the gain medium is $Fe^{2+}$:ZnSe.

In other embodiments the concentration of transition metal along the length of the core is substantially uniform. In another embodiment, a gradient of transition metal composition exists along the length of the core. In yet another embodiment, regions of doped and non-doped gain media alternate throughout the core.

The instant invention allows for precise control of dopant concentration, which is essential to optical fiber function. In one embodiment, the dopant concentration is between $10^{12}$ $cm^{-3}$ and $10^{25}$ $cm^{-3}$. In one embodiment, the dopant concentration is between $10^{16}$ and $10^{24}$. In one embodiment, the dopant concentration is between $10^{16}$ cm$^{-3}$ and $10^{23}$ cm$^{-3}$. In one embodiment, the dopant concentration is between $10^{16}$ cm$^{-3}$ and $10^{22}$ cm$^{-3}$. In one embodiment, the dopant concentration is between $10^{16}$ cm$^{-3}$ and $10^{21}$ cm$^{-3}$. In one embodiment, the dopant concentration is between $10^{17}$ and $10^{20}$. In one embodiment, the dopant concentration is between $10^{18}$ cm$^{-3}$ and $10^{19}$ cm$^{-3}$. In one embodiment, the dopant concentration is between $10^{12}$ and $10^{15}$.

In some embodiments of the invention, it may be advantageous to include a first cladding layer between the transition metal doped chalcogenide and the silica cladding. In one embodiment, the first cladding layer can narrow the line-width of the emission and attenuate the effects of the silica cladding material. In one embodiment, the first cladding layer comprises a chalcogenide. Suitable chalcogenides include, but are not limited to, ZnSe, ZnS, ZnTe, CdSe, CdS, and CdTe. In one embodiment, the first cladding layer comprises ZnS. In one embodiment, the first cladding layer comprises diamond or diamond-like glass.

The transition metal doped chalcogenide in the core can be characterized by Fourier transform infrared absorbance and continuous wave (CW) fluorescence measurements, characterizations aimed in particular at probing the presence of, for example, transition metal ions within the chalcogenide core of the optical fibers. A comparison of the normalized spectral absorbance between the fiber samples and a bulk laser gain element can confirm the presence of transition metal ions in an optical fiber sample.

In some embodiments, the fibers of the invention can be pumped by existing silica based fiber laser technologies operating at the telecommunication wavelength, making their integration into an optical fiber platform straightforward.

Figures 5, 5A, 5B:
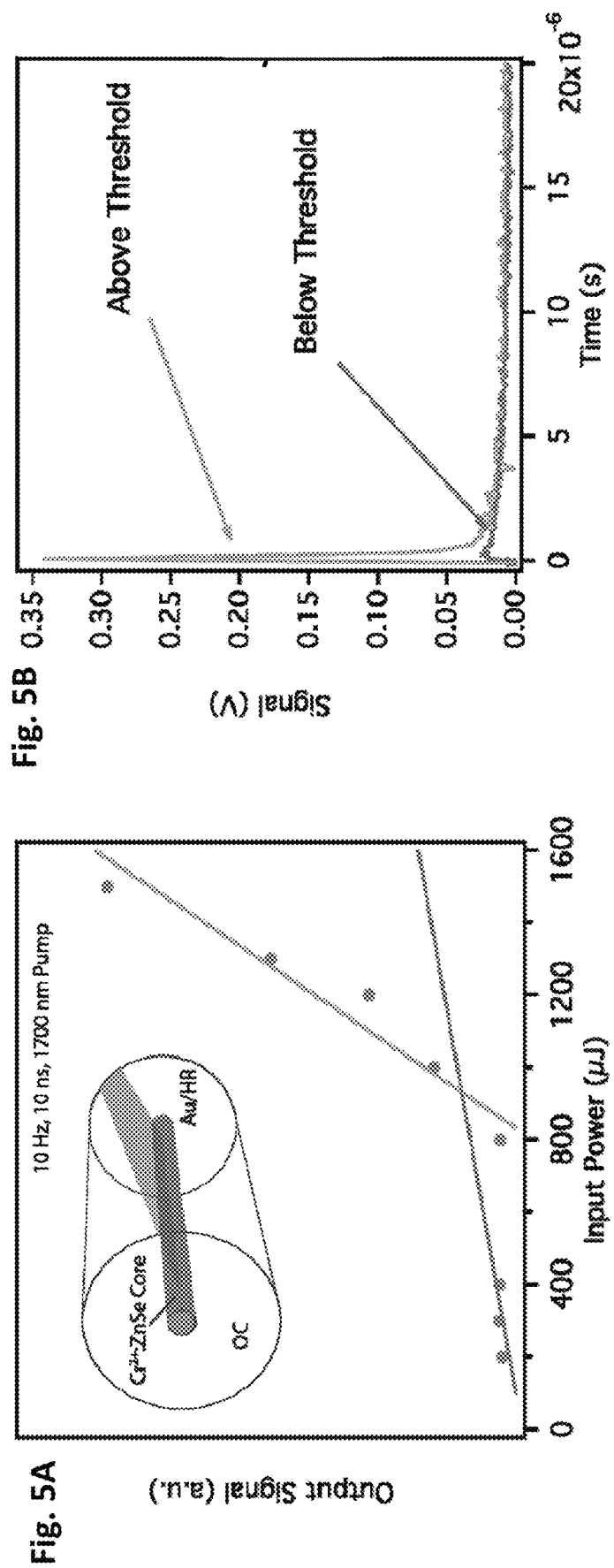
FIG. 5, comprising
FIG. 5A and FIG. 5B, is a series of charts depicting the power curve and time domain fluorescence intensity of the $Cr^{2+}$:ZnSe fiber laser. Gain switched lasing of a 15 μm $Cr^{2+}$:ZnSe optical fiber. Clear evidence of threshold behavior is observed (FIG. 5A) along with a sharpening of the fluorescence lifetime (FIG. 5B).

In one aspect, the optical fiber of the invention can be incorporated into an optical fiber laser. In one embodiment, the optical fibers function well as low loss, step index optical fibers. In one embodiment, the transition metal doped chalcogenide optical fibers can be employed in a laser. In one embodiment, the laser includes an optical cavity constructed by evaporating a reflector on one polished facet of an optical fiber (FIG. 5A). The reflector can be made of any suitable material, such as would be appreciated by one of skill in the art. In one embodiment, the reflector comprises gold or silver. The length of the optical fiber can range from several millimeters, to several centimeters, meters, or kilometers. In one embodiment, the optical fiber is about 0.5 cm long. In one embodiment, a Fresnel reflection is used as an output coupler on the other facet. In one embodiment, optical elements known to those of skill in the art, such as mirrors, couplers, and the like can be employed in the external free space. In one embodiment, the fiber is pumped from the side (FIG. 5A) with, for example, a 10 Hz, 10 ns pulse width pump laser at 1700 nm. In some embodiments, the pump laser can be a fiber laser in the appropriate wavelength range, such as erbium or thulium doped silica lasers or with undoped silica lasers. In other embodiments the laser is pumped by means of the cladding pumping technique, which consists of pumping an inner cladding region surrounding the core, instead of pumping the core directly.

In one embodiment, a laser of the invention including an optical fiber with the geometry described herein, has the ability to handle large optical powers. In one embodiment, a pulsed regime is applied to the laser. In another embodiment, a continuous regime is applied to the laser. In one embodiment, in the continuous wave regime, where heating plays the major role in the damage mechanism, 10 W of 1.9 µm light is coupled into a 15 µm core Cr$^{2+}$:ZnSe optical fiber. In one embodiment, the resulting power density is about 5.6 MW/cm$^2$. In one embodiment, the available power in the CW range limits the determination of the damage threshold of a sample optical fiber. In one embodiment, the damage threshold is orders of magnitude higher than the power density.

In one embodiment, the laser comprising the transition metal doped chalcogenide optical fiber of the invention can be pumped with any pump laser known by those of skill in the art. In one embodiment, the output of the laser is broad band. In one embodiment, the output of the laser is between around 2250 nm and about 2340 nm. In one embodiment, the output of the laser is centered around 2300 nm. In another embodiment, the laser emission is narrow-width and centered around 2486 nm.

Methods

In another aspect, the invention relates to a method of fabrication of a cladded optical fiber comprising a transition metal doped chalcogenide using, for example, a modified chemical vapor deposition (CVD) or hybrid physical-chemical vapor deposition (HPCVD) method. The method is based on the unexpected observation that an organo-transition metal source can be incorporated into an apparatus for the CVD or HPCVD synthesis of a chalcogenide to give a crystalline transition metal doped chalcogenide.

In one embodiment, the method of the invention is carried by employing a chemical vapor deposition (CVD) reactor, device, or apparatus suitable for growing Cr$^{2+}$:ZnSe crystals. As readily apparent any reactor, device, or apparatus known in the art, or appropriately modified, can be used. In another embodiment, the method of the invention is carried out by employing a hybrid physical-chemical deposition (HPCVD) reactor, device, or apparatus.

Exemplary method 100 is shown in FIG. 10. The method of fabricating a cladded optical fiber starts with step 110 in which a cladding material having a lumen with proximal and distal openings, wherein the proximal opening of the lumen is connected to a cavity is provided. In step 120, an organo-transition metal compound in the cavity is positioned in the cavity. In step 130, a mixture comprising an organo-metallic compound, an organo-chalcogen compound, and a reducing agent is passed through the cavity. In step 140, a flow of the organo-transition metal and the mixture is directed into the lumen of the cladding. Finally, in step 150, a transition metal doped chalcogenide is deposited in the lumen of the cladding.

In one embodiment, the method of fabricating a cladded optical fiber utilizes a larger capillary cavity that is spliced to the targeted deposition lumen. In one embodiment, the larger capillary cavity has an interior diameter that is 10 times larger than the targeted deposition lumen. An exemplary system is shown in FIG. 1B. In one embodiment, the larger capillary cavity has an interior diameter between 1 µm and 1000 µm. In one embodiment, the larger capillary cavity has an interior diameter between 100 µm and 1000 µm. In one embodiment, the larger capillary cavity has an interior diameter of about 150 µm.

The targeted deposition lumen receives a flow of gain medium in the HPCVD process. In one embodiment, the lumen is clad in a cladding material known to those in the art, such as those discussed elsewhere herein. In one embodiment, the cladding material is silica. In one embodiment, the cladding material is boron- or fluoride-doped silica. In one material the cladding material is diamond. In one embodiment, the cladding material is diamond-like glass.

In one embodiment, targeted deposition lumen has an interior diameter between 0.1 μm and 100 μm. In one embodiment, the lumen has an interior diameter between 10 and 100 μm. In one embodiment, the lumen has an interior diameter of 15 μm.

The length of cladding material having a lumen is the distance between the distal and proximal openings. In some embodiments, the length can be millimeters, centimeters, or meters.

In one embodiment, a two-zone furnace is used to heat the lumen and the cavity. A two-zone furnace allows for independent modulation of temperature within the lumen and the cavity. In one embodiment, a suitable cavity temperature is chosen to increase the vapor pressure of an organo-transition metal compound but to prevent its decomposition. In one embodiment, a suitable lumen temperature is chosen to effect decomposition of an organo-transition metal compound. In one embodiment, the cavity is heated to a temperature between 100° C. and 500° C. In one embodiment, the cavity is heated to a temperature between 100° C. and 250° C. In one embodiment, the cavity is heated to a temperature of about 100° C. In one embodiment, the cavity is heated to a temperature of about 125° C. In one embodiment, the cavity is heated to a temperature of about 150° C. In one embodiment, the cavity is heated to a temperature of about 175° C. In one embodiment, the cavity is heated to a temperature of about 200° C. In one embodiment, the cavity is heated to a temperature of about 225° C. In one embodiment, the cavity is heated to a temperature of about 250° C.

In one embodiment, the lumen is heated to a temperature of between 100° C. and 1000° C. In one embodiment, the lumen is heated to a temperature of about 100° C. In one embodiment, the lumen is heated to a temperature of about 200° C. In one embodiment, the lumen is heated to a temperature of about 300° C. In one embodiment, the lumen is heated to a temperature of about 400° C. In one embodiment, the lumen is heated to a temperature of about 500° C. In one embodiment, the lumen is heated to a temperature of about 600° C. In one embodiment, the lumen is heated to a temperature of about 700° C. In one embodiment, the lumen is heated to a temperature of about 800° C. In one embodiment, the lumen is heated to a temperature of about 900° C. In one embodiment, the lumen is heated to a temperature of about 1000° C.

In step 120 of the exemplary method, an organo-transition metal compound is positioned in the cavity. The organo-transition metal compound is a complex of the dopant with organic ligands. The end concentration of transition metal dopant in the optical fiber depends on the combined effect of the stability and the vapor pressure of the organo-transition metal compound. In one embodiment, the organo-transition metal is selected based on the desired properties of the resultant optical fiber. In one embodiment, the methods of the invention includes controlling the transition metal doping levels by controlling the substitution patterns of the organo-transition metal compound, substitution patterns which affect the stability and thus the reactivity of the organo-transition metal compound molecules. In one embodiment, the organo-transition metal is stable at temperatures up to about 100° C. In one embodiment, the organo-transition metal is stable at temperatures up to about 125° C. In one embodiment, the organo-transition metal is stable at temperatures up to about 150° C. In one embodiment, the organo-transition metal is stable at temperatures up to about 175° C. In one embodiment, the organo-transition metal is stable at temperatures up to about 200° C. In one embodiment, the organo-transition metal is stable at temperatures up to about 225° C. In one embodiment, the organo-transition metal is stable at temperatures up to about 250° C. In one embodiment, the organo-transition metal is stable at temperatures up to about 275° C. In one embodiment, the organo-transition metal is stable at a temperatures up to about 300° C.

In one embodiment, the organo-transition metal compound is a compound of formula $ML_x$, wherein M is a transition metal, L is at least one organic ligand, and x is an integer between 1 and 6. Exemplary metals M include V, Cr, Mn, Fe, Co, and Ni. In one embodiment, the organo-transition metal compound is an cyclopentadienyl transition metal complex of formula $[(\eta^5-C_5H_4R)_2M]$, $[(\eta^5-C_5H_4R)_2ML_{Ay}]$, or $[(\eta^5-C_5H_4R)ML_{Ay}]$, wherein R is a substituent selected from the group consisting of H, methyl, ethyl, propyl, isopropyl, butyl, t-butyl, and phenyl; $L_A$ is an additional organic or inorganic ligand; and y is an integer between 0 and 3. Exemplary ligands $L_A$ can include hydride, halides, CO, CN, carbenes, alkyl groups, or any other ligands known to those of skill in the art. In one embodiment, the compound is a compound of formula $[(\eta^5-C_5H_4R)_2M]$. In one embodiment, the metal is chromium and the organo-transition metal compound is an organo-chromium compound. In one embodiment, the organo-chromium compound is bis(R-cyclopentadienyl) chromium $(Cr(R-Cp)_2)$. These substituted bis(cyclopentadienyl) chromium compounds are relatively nonvolatile solids and liquids at room temperature, and are thermally compatible with the deposition chemistry. In one embodiment, the organo-transition metal compound is $Cp_2Cr$. In one embodiment, the organo-transition metal compound is $(EtCp)_2Cr$. In one embodiment, the organo-transition metal is $(iPrCp)_2Cr$. In some embodiments, the organo-transition metal is a solid at room temperature. In other embodiments, the organo-transition metal is a liquid at room temperature. In one embodiment, the method includes a means to tune the chromium concentration via ligand chemistry modification, i.e., by varying the further substitution pattern of the cyclopentadienyl substituents. In one embodiment, more volatile molecules will provide a higher concentration of organo-transition metal compound in the HPCVD stream, while less stable molecules will result in more precursor reaction and thus greater transition metal incorporation. In one embodiment, the organo-transition metal compound is placed in the cavity in such a way as not to block the proximal opening of the lumen.

In some embodiments, it may be necessary to control the surface area of the organo-transition metal compound within the cavity, such that the surface area is constant throughout the deposition process. In one embodiment, the surface area of the organo-transition metal compound is controlled through the pinhole method. In one embodiment, the organo-transition metal compound is placed in a hermetically sealed vessel that is sealed to the environment. In one embodiment, a small hole is punched in the vessel. In one embodiment, this vessel is placed within the cavity.

In step 130 of the exemplary method, a mixture comprising an organo-metallic compound, an organo-chalcogen compound, and a reducing agent are passed through the cavity. In one embodiment, the organic-metallic compound is a compound of formula $R_1R_2M$, where $R_1$ and $R_2$ are independently of each other selected from the group consisting of methyl, ethyl, n-butyl, isoamyl, t-butyl, neopentyl, n-propyl, and isopropyl; and M is a transition metal selected from the group consisting of Zn, Cd, Hg, Fe, and Mn. In one embodiment, the organo-metallic compound allows for "reactant encapsulation," such that reaction occurs more readily in smaller containers, i.e., reaction occurs in the lumen and not in the cavity containing the organo-transition metal compound. In one embodiment, the organo-metallic compound is an organo-zinc compound. Exemplary organo-zinc compounds include dimethyl zinc, diethyl zinc, di(n-butyl) zinc, di(isoamyl) zinc, di(t-butyl) zinc, dineopentyl zinc, dipropyl zinc, diisopropyl zinc, and methylethyl zinc. In one embodiment, the organo-zinc compound is dimethyl zinc.

In one embodiment, the organo-chalcogen compound is a compound of formula $R_1R_2X$, where $R_1$ and $R_2$ are independently of each other selected from the group consisting of hydrogen, methyl, ethyl, n-butyl, isoamyl, t-butyl, neopentyl, n-propyl, and isopropyl; and X is a chalcogen element selected from the group consisting of S, Se, and Te. Exemplary organo-chalcogens include organo-Se compounds, organo-S compounds, and organo-Te compounds. In one embodiment, the organo-chalcogen is an organo-Se compound. Exemplary organo-Se compounds include hydrogen selenide, dimethylselenide, diethylselenide, di(n-butyl)selenide, di(isoamyl)selenide, di(t-butyl)selenide, dineopentylselenide, dipropylselenide, diisopropylselenide, and methylethylselenide. In one embodiment, the organo-chalcogen is dimethylselenide.

The stream of reactants, comprising the reducing agent, the organo-metallic compound and the organo-chalcogen compound, is passed through an atmosphere including the vapors of the organo-transition metal compound, resulting in the deposition of the doped chalcogenide compound in the lumen. In one embodiment, the organo-transition metal decomposes as a result of heating in the lumen. In one embodiment, the reducing agent is a gas. In one embodiment, the reducing agent comprises hydrogen gas. In one embodiment, the reducing agent is hydrogen gas.

In one embodiment, the reducing agent is a carrier gas, and the reacts, comprising the reducing agent, organo-metallic compound, and organo-chalcogen compound, are pressurized. In one embodiment, reactants are pressurized to between 5 and 100 MPa. In one embodiment, the reactants are pressurized to between 20 and 100 MPa. In one embodiment, the reactions are pressurized to between 50 and 100 MPa. In one embodiment, the reacts are pressurized to about 50 MPa. In one embodiment, the reacts are pressurized to about 60 MPa. In one embodiment, the reacts are pressurized to about 70 MPa. In one embodiment, the reacts are pressurized to about 80 MPa. In one embodiment, the reacts are pressurized to about 90 MPa. In one embodiment, the reacts are pressurized to about 100 MPa.

In one embodiment, a two-zone furnace is used separately control the temperature of the lumen and the cavity. A two-zone furnace allows for independent modulation of temperature within the lumen and the cavity. In one embodiment, a suitable cavity temperature is chosen to increase the vapor pressure of an organo-transition metal compound but to prevent its decomposition. In one embodiment, the cavity is heated to a temperature of at least 200° C. In one embodiment, the cavity is heated to a temperature between 100° C. and 500° C. In one embodiment, the cavity is heated to a temperature between 100° C. and 250° C. In one embodiment, the cavity is heated to a temperature of about 150° C. In another embodiment, the cavity is heated to a temperature of about 225° C.

In one embodiment, a suitable lumen temperature is chosen to effect decomposition of an organo-transition metal compound. In one embodiment, the lumen is heated to a temperature of between 100° C. and 1000° C. In one embodiment, the lumen is heated to a temperature of about 100° C. In one embodiment, the lumen is heated to a temperature of about 200° C. In one embodiment, the lumen is heated to a temperature of about 300° C. In one embodiment, the lumen is heated to a temperature of about 400° C. In one embodiment, the lumen is heated to a temperature of about 500° C. In one embodiment, the lumen is heated to a temperature of about 600° C. In one embodiment, the lumen is heated to a temperature of about 700° C. In one embodiment, the lumen is heated to a temperature of about 800° C. In one embodiment, the lumen is heated to a temperature of about 900° C. In one embodiment, the lumen is heated to a temperature of about 1000° C.

In step 140 of the exemplary method, a flow of the organo-transition metal and the mixture comprising an organo-metallic compound, an organo-chalcogen compound, and a reducing agent is directed into the lumen of the cladding. It should be appreciated that the organo-transition metal compound is placed in the cavity in such a way as to not block the proximal opening of the lumen.

In step 150 of the exemplary method, the transition metal doped chalcogenide is deposited in the lumen of the cladding. In one embodiment, unreacted organo-transition metal, organo-chalcogen, organo-metallic compound, and reducing agent pass through the distal opening of the lumen. In one embodiment, the reaction between reducing agent, organo-metallic compound, and organo-chalcogen compound results in the deposition of chalcogenide and the release of the organic ligands. In one embodiment, the thermal decomposition of the organo-transition metal compound results in deposition of the transition metal dopant. In one embodiment, the decomposition of the organo-transition metal compound and the reduction of the organo-metallic compound and the organo-chalcogen compound occur simultaneously and at the same rate throughout the deposition process. In one embodiment, the two reactions result in an optical fiber with a constant dopant concentration throughout the material.

In some embodiments of the invention, it may be advantageous to deposit a first cladding before positioning the organo-transition metal compound in the cavity. In one embodiment, this first cladding would comprise a layer between the silica capillary and the transition metal doped chalcogenide in the final optical fiber. In one embodiment, the first cladding layer can be formed by passing a mixture comprising an organo-metallic compound, an organo-chalcogen compound, and a reducing agent through the cavity. In one embodiment, passing this mixture through the cavity results in the depositing of a chalcogenide in the cavity.

In one embodiment, the organo-metallic compound for the first cladding layer is a compound of formula $R_1R_2M$, where $R_1$ and $R_2$ are independently of each other selected from the group consisting of methyl, ethyl, n-butyl, isoamyl, t-butyl, neopentyl, n-propyl, and isopropyl; and M is a transition metal selected from the group consisting of Zn, Cd, Hg, Fe, and Mn. In one embodiment, the organo-chalcogen compound for the first cladding layer is a compound of formula $R_1R_2X$, where $R_1$ and $R_2$ are independently of each other selected from the group consisting of methyl, ethyl, n-butyl, isoamyl, t-butyl, neopentyl, n-propyl, and isopropyl; and X is a chalcogen element selected from the group consisting of S, Se, and Te. In one embodiment, the organo-metallic compound for the first cladding layer is an organo-zinc compound (i.e., M is Zn). In one embodiment, the organo-metallic compound for the first cladding layer is dimethyl zinc. In one embodiment, the organo-chalcogen compound for the first cladding layer is an organo-sulfur compound (i.e., X is sulfur). In one embodiment, the organo-chalcogen compound for the first cladding layer is dimethylsulfide.

The methods described herein may be used to form bulk crystalline transition metal doped chalcogenide materials in any shape or configuration. Accordingly, one aspect of the present invention relates to a method of fabrication of a bulk transition metal doped chalcogenide material. In one embodiment, this method employs a traditional chemical vapor deposition (CVD) reactor such as is commonly known to those of skill in the art. In one embodiment, the CVD takes place within a growth chamber such as is known to those of skill in the art.

The method of fabricating a bulk crystalline material includes the steps of positioning a substrate in a growth chamber; independently providing an organo-metallic compound, an organo-chalcogen compound, an organo-transition metal compound, and a reducing agent into the growth chamber; and depositing a transition metal doped chalcogenide on the substrate.

In one embodiment, the organo-transition metal compound, organo-metallic compound, organo-chalcogen compound, and reducing agent are held in separate vessels. In one embodiment, the four components are introduced into a chamber comprising the substrate to be coated. The substrate can be any known to those of skill in the art; exemplary substrates include, but are not limited to, metals, metal alloys, glasses/crystalline substrates, cloth, and plastics. In one embodiment, the substrate is heated to a temperature designed to effect the reduction of the organo-metallic compound and the organo-chalcogen compound to form an organo-chalcogenide and to effect decomposition of the organo-transition metal compound, as discussed elsewhere herein.

In one embodiment, the organo-metallic compound is selected from an organo-zinc compound, an organo-cadmium compound, and an organo-mercury compound. In one embodiment, the organo-metallic compound is an organo-zinc compound. In one embodiment, the organo-metallic compound is dimethyl zinc.

In one embodiment, the organo-chalcogen compound is selected from an organo-sulfide compound, an organo-selenide compound, and an organo-telluride compound. In one embodiment, the organo-chalcogen compound is an organo-selenide compound. In one embodiment, the organo-chalcogen compound is dimethylselenide. In another embodiment, the organo-chalcogen compound is an organo-sulfide compound. In one embodiment, the organo-chalcogen compound is dimethylsulfide.

In one embodiment, the organo-transition metal compound is an organo-chromium compound. In one embodiment, the organo-chromium compound is selected from the group consisting of $Cp_2Cr$, $(EtCp)_2Cr$, and $(iPrCp)_2Cr$. In one embodiment, the organo-transition metal compound is $(EtCp)_2Cr$.

In one embodiment, the method of fabricating a bulk crystalline material results in the deposition of a transition metal doped chalcogenide material on the substrate. In one embodiment, the chalcogenide is a II-VI semiconductor. In some embodiments the chalcogenide can be ZnSe, ZnS, ZnTe, CdSe, CdS, CdTe, HgS, HgSe, or HgTe. In one embodiment, the chalcogenide is ZnSe. In some embodiments the transition metal dopant is selected from groups 4, 5, 6, 7, 8, 9, 10, 11, or 12 of the periodic table, as would be appreciated by one of skill in the art. In one embodiment, the transition metal is chromium.

EXPERIMENTAL EXAMPLES

The invention is further described in detail by reference to the following experimental examples. These examples are provided for purposes of illustration only, and are not intended to be limiting unless otherwise specified. Thus, the invention should in no way be construed as being limited to the following examples, but rather, should be construed to encompass any and all variations which become evident as a result of the teaching provided herein.

Without further description, it is believed that one of ordinary skill in the art can, using the preceding description and the following illustrative examples, make and utilize the compositions of the present invention and practice the claimed methods. The following working examples therefore, specifically point out the preferred embodiments of the present invention, and are not to be construed as limiting in any way the remainder of the disclosure.

Materials and Methods

Fabrication of the $Cr^{2+}$:ZnSe fiber laser elements was accomplished using a modified version of the HPCVD synthesis reported for ZnSe optical fibers described elsewhere herein (Sparks, et al., Advanced materials, 2011, 23, 1647-1651).

Samples for scanning electron microscopy (SEM) were prepared by mechanical polishing followed by coating in Iridium. SEM images were taken using a FEI Quanta 200 microscope.

FT-IR experiments were carried out using a Bruker Hyperion 3000 IR microscope. Near and mid-IR light was coupled into a 50 μm core $Cr^{2+}$:ZnSe fiber optic using reflective optics and collected in the same way. The transmitted light was then fed into the FT-IR spectrometer. A reference spectrum of air alone was then used to calculate the absorbance.

Fluorescence measurements were carried out by pumping the fiber optic samples with a 1.9 μm thulium fiber optic laser (IPG photonics) or a 1.55 μm fiber coupled laser diode (Thorlabs). Light was coupled into the fiber cores via an end-pump geometry using high NA, AR coated lenses and collected in the same way. The collected light was then fed into a 156 mm monochromator (Jarrell Ash Monospec 18) with a 300 g/mm grating and an extended range InGaAs single channel detector (Hamamatsu).

Continuous wave power handling measurements were performed with the an IPG Photonics 1.9 μm thulium fiber laser (TLR-10-1908) operating at maximum power, 10 W, which was focused into a 15 μm diameter fiber using an appropriate AR coated lens to match the core size of the fiber. For pulsed damage threshold measurements using a Mai Tai HP mode-locked Ti:sapphire femtosecond laser source operating at 950 nm with an 80 MHz repetition rate. Pulse duration was 100 fs. 300 mW of average power was focused using an AR coated lens to match the core size of an 11 μm ZnSe fiber.

For time domain measurements, a 10 Hz repetition rate, 10 ns pulse duration optical parametric oscillator (Spectraphysics) operating at 1.7 μm was used to pump the optical fiber laser in a side-pumped geometry. The pump beam was focused onto the core along the 5 mm length of the sample using a cylindrical lens. The cavity was formed with an evaporated gold mirror on one facet and Fresnel reflection was employed as an output coupler from the other facet. The signal was passed through two 2 μm long-pass filters, focused onto an extended range InGaAs single channel detector (Hamamatsu) and processed with a gated integrator and boxcar average (Stanford Research Systems).

For frequency domain measurements, a sample was pumped using a home-built Ho:YAG pulsed laser operating at 2.09 µm and delivering 10 KHz, 200 ns pulses. No coating or other preparation was undertaken to minimize reflections at the core-air interface. The sample was then inserted into a cavity consisting of a dichroic input coupler (transmission >98% at 1908 nm, reflectivity >99% at 2450 nm), through which it was pumped, and a partially reflective (90%) dielectric output coupler. A ZnSe lens, AR coated at the pump wavelength, was used to couple light into the sample, while a Mid-IR AR coated calcium fluoride lens was used to collect sample light, where it was directed to a 750 mm monochromator (Acton Research Corporation) equipped with an extended range InGaAs detector (Hamamatsu). Gain-switched lasing was seen to arise above 500 mW of average pump power, or 50 µJ per pulse, and was stable in its output.

Example 1: A Novel In-Situ Doping Methodology

An alternative approach to optical fiber fabrication, high pressure chemical vapor deposition (HPCVD), is well suited to using pre-drawn silica capillaries as templates for the chemical deposition of materials that are not amenable to the drawing process (Sparks, et al., Annual Review of Materials Research, 2013, 43, 527-557; Sparks, et al., Advanced Functional Materials, 2013, 23, 1647-1654). Previous reports have resulted in centimeters-long undoped HPCVD zinc selenide fibers with a low enough optical loss of ~1 dB/cm for lasing applications (Sparks, et al., Advanced Materials 2011, 23, 1647; Sparks, et al., Advanced Functional Materials 2013, 23, 1647).

The HPCVD of Cr:ZnSe requires a novel chemical reaction to be developed as there have been no reports of the chemical vapor deposition of Cr:ZnSe in the literature. Most films and bulk crystals are fabricated via diffusion doping of chromium metal (Yu, et al., Semiconductors 2005, 39, 401; Akimov, et al., Physica Status Solidi (c) 2006, 3, 1213), although molecular beam epitaxy (Jouanne, et al., Journal of Alloys and Compounds 2004, 382, 92), co-sputtering (Vivet, et al., Materials Science and Engineering: B 2008, 146, 236), and physical vapor transport (Su, et al., Journal of Crystal Growth 1999, 207, 35; J.-O. Ndap, et al., Journal of Crystal Growth 2002, 240, 176) methods have been reported. None of these methods is readily adaptable to the fiber geometry; diffusion doping methods in particular result in uniform chromium concentrations only over relatively small (1 mm) length scales (Yu, et al., Semiconductors 2005, 39, 401; Demirbas, et al., Optical Materials 2006, 28, 231) and are not amendable to the long optical fibers produced by HPCVD.

Instead, fabrication of the Cr:ZnSe fiber laser elements is accomplished using a modified version of the HPCVD synthesis for ZnSe optical fibers previously reported. Briefly, dimethyl selenide and dimethyl zinc are pressurized with hydrogen as a carrier gas/reactant to 70 MPa. This mixture is then introduced into a silica microcapillary and the deposition of ZnSe is carried out at 500° C. Dimethylselenide and dimethylzinc precursors were selected because they allow for "reactant encapsulation" such that reaction only occurs in the heated capillary and pre-reaction in the precursor mixture before entering the heated zone is precluded. However, these ZnSe fibers must be uniformly doped along their length at appropriate concentrations of $10^{18}$-$10^{19}$ cm$^{-3}$ with $Cr^{2+}$ for lasing applications. Excessive $Cr^{2+}$ ions result in fluorescence quenching while low concentrations may limit laser optical power.

It is important to develop suitable chemistries that are compatible with the ZnSe HPCVD process. Common volatile chromium CVD precursors such as chromium carbonyl decompose at far too low of a temperature (250° C.) to be compatible with the approximately 500° C. HPCVD ZnSe deposition temperature and tend to form chromium- and zinc-rich islands within the capillaries. Bis(cyclopentadienyl) chromium (II) ($Cp_2Cr$), metallocene metal-organic chemical vapor deposition (MOCVD) and atomic layer deposition (ALD) precursor, decomposes at higher, more compatible temperatures. The $Cp_2Cr$ molecule can be made more reactive by adding R groups to the cyclopentadienyl rings ($RCp_2Cr$) to make the reaction byproducts more stable. These derivatives have not been investigated much as chemical precursors in deposition reactions and provide opportunities to tune vapor pressure and reactivity. The pyrolysis reaction is shown below.

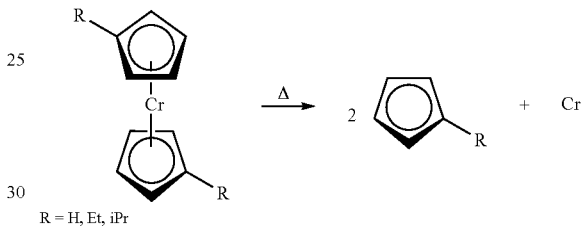

R = H, Et, iPr

While not wishing to be bound to any particular theory, it is possible that the increased ring stability results in a weaker bond between Cr and the rings and thus a lower decomposition temperature, which is supported by the relative instability of bis(benzene)chromium relative to $Cp_2Cr$. (Dyagileva, et al., Russian Chemical Reviews 1988, 57, 316) The effect of functionalization in ferrocene (bis(cyclopentadienyl)iron (II)) compounds is also well understood and the experimental data also supports this hypothesis: the addition of two tert-butyl groups onto each cyclopentadiene ring of ferrocene increases its rate of pyrolysis by as much as 300 times (Dyagileva, et al., Russian Chemical Reviews 1988, 57, 316). In addition, substitution affects the precursor vapor pressure at a given temperature. We primarily investigated $Cp_2Cr$ and bis(ethylcyclopentadienyl) chromium ($EtCp_2Cr$); an exploration of bis(isopropylcyclopentadienyl) chromium ($iPrCp_2Cr$) demonstrated that it was largely incompatible with the deposition temperatures used to deposit ZnSe due to its relative instability. According to the analysis above, $Cp_2Cr$ will be more stable than $EtCp_2Cr$, while $EtCp_2Cr$ will be more volatile at a given temperature than $Cp_2Cr$. The sublimation and vaporization enthalpies of the compounds, which correspond inversely to their volatilities were experimentally determined via a modified version of a thermogravimetric method (Ashcroft, Thermochimica Acta 1971, 2, 512) to be 64.2 kJ mol$^{-1}$ and 53.1 kJ mol$^{-1}$ respectively. The concentration of $Cr^{2+}$ ions ultimately depends on both the concentration of the chromium precursor in the HPCVD stream, as determined by volatility, and the stability of the precursor molecule at the deposition temperature used for ZnSe.

A key challenge in codeposition of $Cr^{2+}$ with ZnSe fibers is the need to introduce a low vapor pressure precursor into a high-pressure microfluidic reactant stream. To accomplish this, an all-fiber microfluidic reaction vessel is fabricated using standard optical fiber fusion splicing techniques (FIG. 1B). A large inner diameter capillary (150 μm) is first spliced to a 15 μm diameter deposition target capillary. Solid or liquid dopant precursors are readily introduced into the larger capillary without blocking the smaller one. By controlling the heating of the two capillaries independently, such as using a two-zone furnace to heat the capillary reaction vessel, the temperature, and thus the vapor pressure of the chromium source, can be controlled, as can the rate of deposition of $Cr^{2+}$:ZnSe in the smaller capillary (FIGS. 1B & 1C). As the ZnSe HPCVD precursor mixture (dimethylselenide and dimethylzinc with a hydrogen carrier gas/reactant at 70 MPa) flows over the chromium source, the vaporized precursor molecules are carried downstream into the smaller target deposition fiber. The splicing technique alleviates the issues involved in heating traditional CVD bubblers at high pressure to vaporize a sufficient amount of chromium precursor before introducing the precursor mixture into the silica capillary and thus represents a significant improvement in the HPCVD methodology in that solid, liquid, and gaseous precursors can now be utilized simultaneously. Heating the larger capillary to 200° C. with, for example, $Cp_2Cr$ in loaded inside vaporizes this precursor into the reactant stream and deposition of $Cr^{2+}$:ZnSe occurs in the smaller capillary at 500° C. The $Cr^{2+}$:ZnSe fills the capillary such that only a very small central pore remains, forming a fiber core. The deposited fiber core is of similar structural and optical quality to undoped ZnSe optical fibers previously reported (FIG. 2) and guides light (FIG. 2C).

Thus, the "microfluidic bubbler" HPCVD methodology allows solid, liquid, and gaseous precursors to all be used simultaneously. Low vapor pressure solids and liquids such as are required for $Cr^{2+}$ doping of ZnSe, in particular, would be difficult to employ for HPCVD with traditional bubbler equipment without premature condensation. An additional advantage of the microfluidic doping approach is that much simpler and lower cost equipment (FIG. 1C) is employed in comparison with traditional equipment for preform fabrication, fiber drawing and/or conventional chemical vapor deposition. The capillary fiber template itself becomes both the "bubbler" and the deposition chamber.

Figure 3:
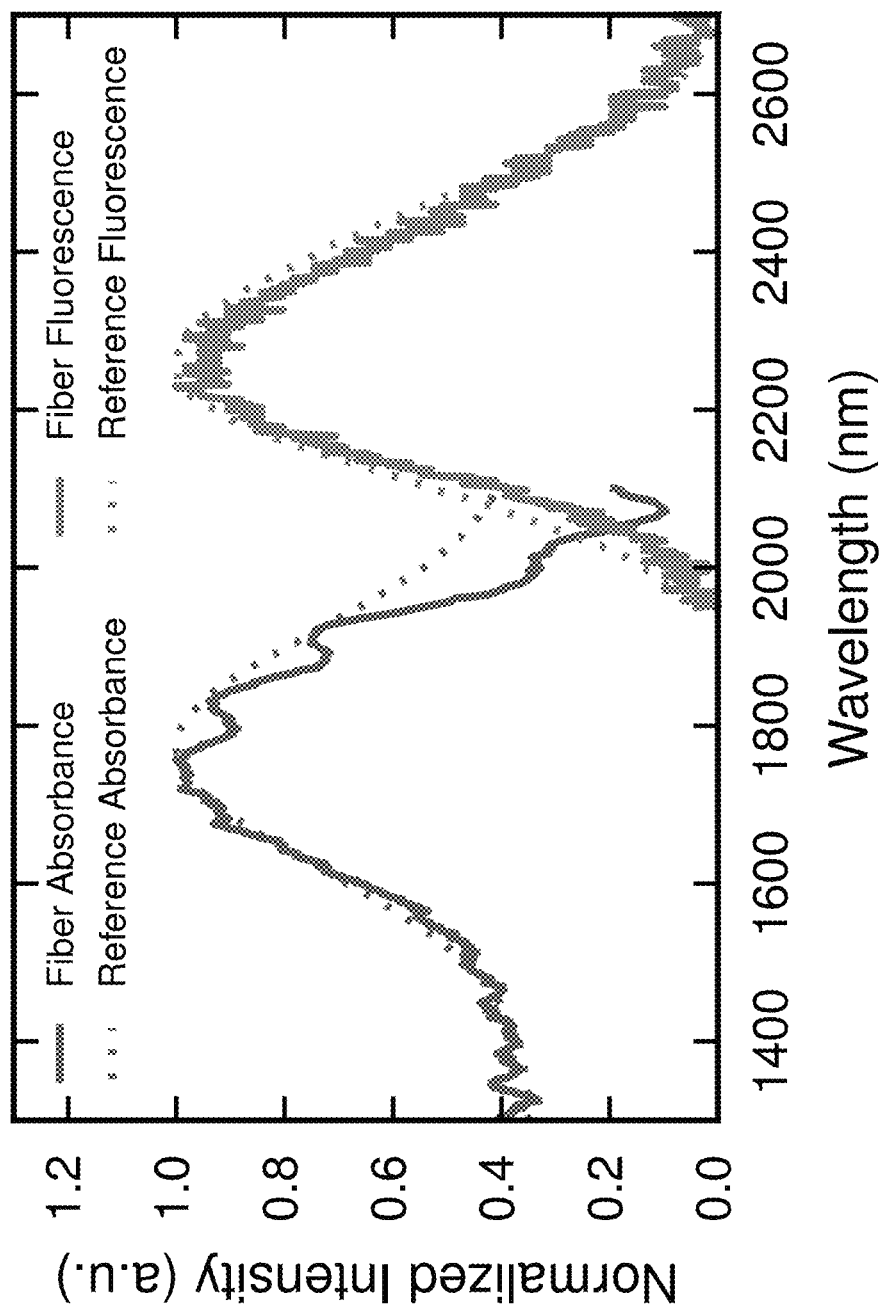
FIG. 3 is a chart depicting the absorption and fluorescence spectra of a $Cr^{2+}$:ZnSe fiber laser, as compared to a bulk $Cr^{2+}$:ZnSe laser element. $Cr^{2+}$:ZnSe absorption and fluorescence signal (solid lines) from material deposited with $Cr(EtCp)_2$ and $Cr(Cp)_2$ as the source, respectively. The dotted lines are the spectra obtained from a commercially produced $Cr^{2+}$:ZnSe laser gain element.

Example 2: Effect of Dopant Functionalization on Dopant Concentration and Distribution Fourier transform infrared absorbance and CW fluorescence measurements were carried out to probe the presence of $Cr^{2+}$ ions within the ZnSe optical fibers. A comparison of the normalized spectral absorbance between the fiber samples and a bulk $Cr^{2+}$:ZnSe laser gain element confirms the presence of $Cr^{2+}$ ions in the fiber samples (FIG. 3). The absorption of the $Cr^{2+}$:ZnSe indicates that such fibers could be pumped by existing silica based fiber laser technologies operating at the telecommunication wavelength, making their integration into the optical fiber platform much more straightforward. The normalized fluorescence spectra of the $Cr^{2+}$:ZnSe optical fiber and bulk $Cr^{2+}$:ZnSe crystal provide further confirmation of the presence of $Cr^{2+}$ ions doped into the $Zn^{2+}$ tetrahedral sites of the host lattice as do addition photoluminescence measurements. Thus, the chemical deposition chemistry produces ZnSe doped with Cr in the desired 2+ oxidation state.

The stability of the precursor molecule, and thus the reactivity, can be tailored such that the doping levels can be readily controlled. As noted elsewhere herein, the $Cr(Cp)_2$ molecule can be made more reactive by substituting the hydrogen atoms on the cyclopentadienyl ring to make the resulting ring byproduct more stable. In addition, substitution affects the precursor vapor pressure at a given temperature. According to the analysis above, the molecules can be ordered from the most stable to least stable as: $Cr(Cp)_2>Cr(EtCp)_2>Cr(iPrCp)_2$, while the vapor pressure at a given temperature can be ordered from lowest to highest as: $Cr(Cp)_2<Cr(iPrCp)_2<Cr(EtCp)_2$. The concentration of $Cr^{2+}$ ions ultimately depends on both the concentration of the chromium precursor in the HPCVD stream and the stability of the precursor molecule at the deposition temperature of ZnSe.

The effects of both vapor pressure and stability on the end concentration of $Cr^{2+}$ in the material can be expected to be coupled. More volatile molecules will provide a higher concentration of chromium precursor in the HPCVD stream, while the less stable molecules will result in more precursor reaction and thus greater chromium incorporation. The impacts of precursor chemistry on the deposition reaction along the length of the fiber reaction chamber must also be considered. For example, too rapid or too slow a rate of precursor reaction could also lead to non-uniformity of the $Cr^{2+}$ concentration along the length of the fiber. Accurate direct measurement of the low concentrations of $Cr^{2+}$ associated with doping remains a challenge. Therefore indirect spectroscopic methods such as infrared absorption or fluorescence emission are typically used instead. We measured the fluorescence spectra of the $Cr^{2+}$:ZnSe fiber cores at different positions along their length to qualitatively investigate the impact of precursor chemistry and reaction conditions on $Cr^{2+}$ doping level and uniformity. In FIG. 4A and Table 1, the effects on chromium concentration as a function of source molecule at a fixed source temperature of 150° C. are shown. As anticipated, a low source temperature of 150° C. and the solid $Cp_2Cr$ precursor, which has a relatively low vapor pressure, does not produce fiber cores with intense fluorescence, while fibers fabricated with the $EtCp_2Cr$ precursor display significant fluorescence. FIG. 4B and Table 2 highlight the coupled nature of the process, with the liquid sources at 150° C. and the solid $Cp_2Cr$ source at 225° C., and also serves to illustrate the effects of chromium precursor stability on final chromium concentration uniformity. For each precursor, a fluorescence spectrum was measured at the two ends of a one centimeter long fiber sample. It can be seen that the doping level of $EtCp_2Cr$ and $Cp_2Cr$ is comparable at different source temperatures and is uniform over centimeter length scales, although more so for $EtCp_2Cr$, which indicates that their relative stabilities are compatible with the ZnSe deposition. This is important for laser applications and represents a significant advantage over diffusion doping, where doping uniformity is typically on the millimeter length scale. Preliminary experiments with the $iPrCp_2Cr$ precursor showed a significant difference in the emission intensity is observed over a one centimeter fiber length. The portion of the deposited fiber closest to the HPCVD source has a significantly higher $Cr^{2+}$ concentration than the downstream region, which indicates that the $iPrCp_2Cr$ precursor is not stable enough for the ZnSe chemistry and decomposes at too low of a temperature. However, the possibility that the $iPrCp_2Cr$ precursor produces very high doping levels, which would result in concentration quenching and a reduced fluorescence intensity, cannot be discounted. The $EtCp_2Cr$ precursor is therefore seen to be optimal for HPCVD as it allows for uniform doping, meaning it represents a good thermal match with ZnSe reaction chemistry, as well as exhibits a high vapor pressure at 150° C. This chemistry is not only useful for Cr²⁺:ZnSe fiber cores, but should be readily adaptable to traditional CVD approaches for the fabrication of bulk Cr²⁺:ZnSe crystals.

TABLE 1

Cr²⁺:ZnSe fluorescence for different cyclopentadiene ring substituent at a fixed source temperature of 150° C. The precursor with the highest vapor pressure, EtCp₂Cr, deposits fiber cores with the highest fluorescence signal.

| Sample | Source Temperature (° C.) | Peak Output Power (nW) |
|---|---|---|
| Cp₂Cr | 150 | 0.0005 |
| EtCp₂Cr | 150 | 1.39 |

TABLE 2

Cr²⁺:ZnSe fluorescence for different ring substituents at temperatures of 150° C. and 225° C. at two different positions along the length of the fiber core, separated by 1 cm.

| Sample | Source Temperature (° C.) | Peak Output Power (nW) |
|---|---|---|
| Cp₂Cr (2.5 cm) | 225 | 2.24 |
| Cp₂Cr (3.5 cm) | 225 | 1.16 |
| EtCp₂Cr (2.5 cm) | 150 | 1.22 |
| EtCp₂Cr (3.5 cm) | 150 | 1.39 |
| iPrCp₂Cr (2.5 cm) | 150 | 0.22 |
| iPrCp₂Cr (3.5 cm) | 150 | 0.03 |

Example 3: Damage Threshold Measurements and Demonstration of Lasing

As shown in earlier work, the HPCVD ZnSe filled capillaries function well as low loss, step index optical fibers (FIG. 2C; Sparks, et al. Advanced materials, 2011, 23, 1647-1651,). With the Cr doping chemistry developed, the basic structure could be investigated for optical fiber laser demonstrations. One of the key advantages of the optical fiber geometry is the ability to handle large optical powers. The power handling capability of the optical fibers was tested in both continuous and pulsed regimes. In the continuous wave regime, where heating plays the major role in the damage mechanism, 10 W of 1.9 μm light has been coupled into a 15 μm core Cr²⁺:ZnSe optical fiber. Thus, the resulting power density is 5.6 MW/cm². However, the available power in the CW range limited the determination of the damage threshold of the sample, which could be orders of magnitude higher. In the pulsed regime, where nonlinear absorption plays the major role in the damage mechanism, 3.5 kW peak power at 1.0 μm has been coupled into a 10 μm ZnSe core during second harmonic generation experiments before the core is damaged, which results in a damage threshold of 4.5 GW/cm² (Vukovic, et al. Scientific reports, 2015, 5, 11798).

To investigate the lasing properties of the Cr²⁺:ZnSe optical fibers, a simple optical cavity was constructed by evaporating a gold high reflector on one facet of the polished, ~0.5 cm long fiber. Fresnel reflection served as an output coupler on the opposite facet. The fiber was pumped from the side (FIG. 5A) with a 10 Hz, 10 ns pulse width pump laser at 1700 nm. Clear evidence of a lasing threshold of approximately 800-1000 μJ is seen in an output power (at 2-3 μm) versus input power plot (FIG. 5A) using this device setup. In the time domain, a sharp increase in output intensity along with a decrease in the lifetime of the Cr²⁺ fluorescence from 5 μs to <500 ns indicates that the cavity is above threshold and lasing in the gain switched regime (FIG. 5B).

Figure 6:
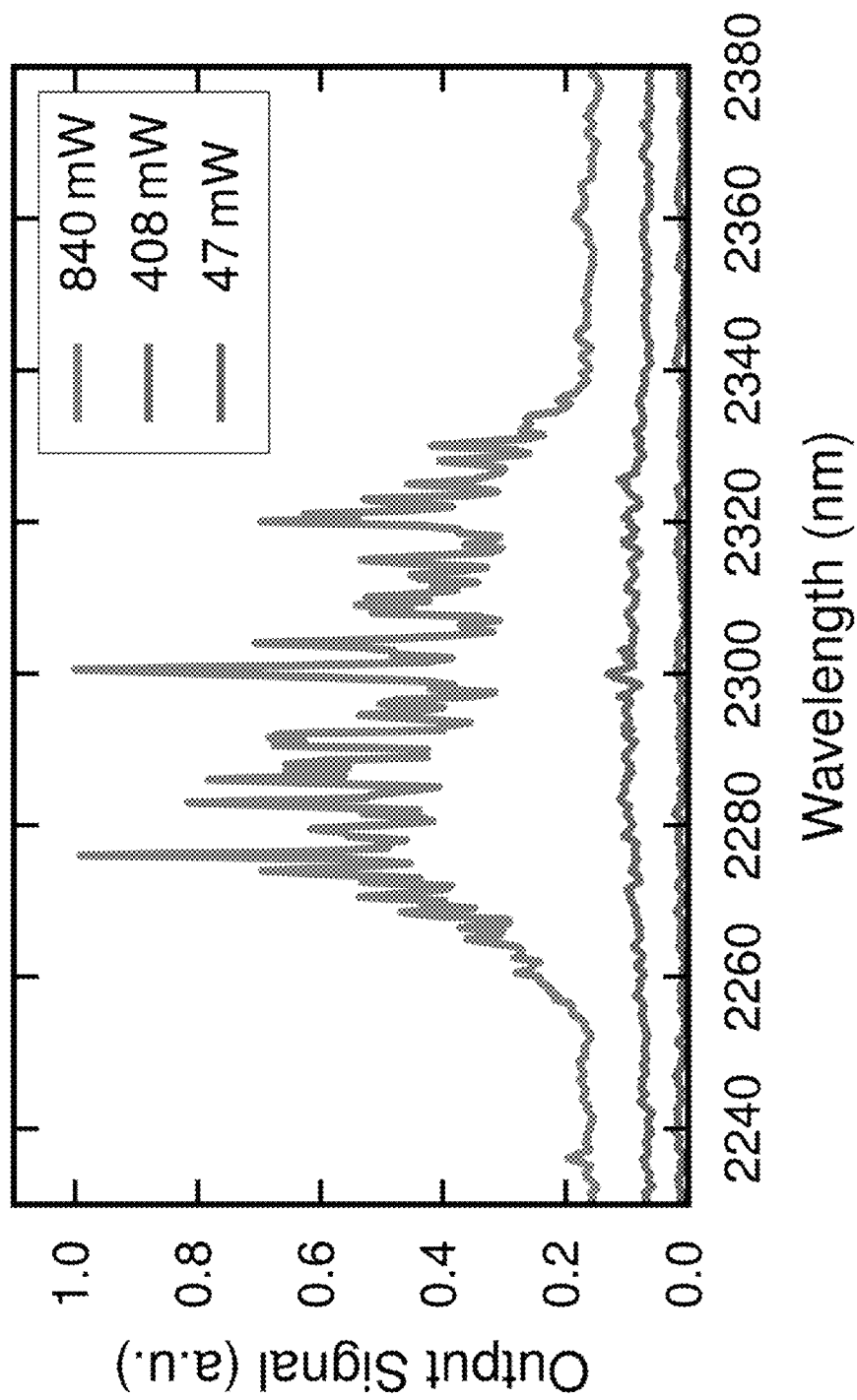
FIG. 6 is a chart depicting the fluorescence output spectra of $Cr^{2+}$:ZnSe fiber lasers below and above the lasing threshold. Shown are the spectral emissions of a $Cr^{2+}$:ZnSe fiber laser at three separate average pump powers, the highest of which is above the laser threshold.

To investigate the lasing behavior in the frequency domain, a sample was pumped using a custom-built Ho:YAG pulsed laser operating at 2.09 μm and delivering 10 KHz, 200 ns pulses. Above the lasing threshold, the output of the fiber laser is broad band and within the free-running spectral range of Cr²⁺:ZnSe, centered around 2300 nm (FIG. 6). The lasing wavelength is surprisingly short considering previous work demonstrating channel waveguide lasers operating at 2486 nm (Macdonald, et al., Optics Letters 2013, 38, 2194-2196). It is likely that absorption from the silica cladding is leading to this relatively short output wavelength, but it could also be indicative of lower chromium concentrations (Sennaroglu, et al., Optical Materials 2007, 29, 703-708). Because the laser output was much lower than expected spectrally, the cavity elements used were not effective, leading to the broad line-width usually seen in a free-running gain medium. With the application of appropriate cavity elements, narrow line-width emission and CW operation should be realized. Furthermore, the effects of the silica cladding can be eliminated by first depositing a ZnS cladding before the Cr²⁺:ZnSe core optical fibers using previously reported HPCVD chemistries (Sparks, et al., Advanced materials, 2011, 23, 1647-16510).

An even more effective approach would involve diamond as a cladding material. In addition to controlling the mode structure, allowing low order or even single mode operation, such structures would have great potential to overcome thermal limitations. Finite element analysis has been used to estimate the upper limit of continuous wave output power from a 50 μm core Cr²⁺:ZnSe fiber optic clad in diamond, yielding a result of 483 W. Although lasing operation is expected to reduce the heat load, at a certain point of pumping, a small increase in temperature will lead to an increased rate of non-radiative relaxation, which in turn leads to decreased lasing and greater temperature rise. This feedback can continue until lasing stops completely. This number is therefore the result of balancing thermal effects and material damage thresholds with conservative estimates of device performance based on published data to find the critical temperature (see Example 5 for full calculation details). Such a calculation requires the assumption of a best case scenario for a 50 μm diameter waveguide clad in diamond, a slope efficiency of 0.83 (quantum limit) and a threshold pump power of 0.1 W, which is the best reported for Cr:ZnSe waveguides. This yields a critical temperature change of 117 K and a $dT/dP_{in}$=1.18 K/W. From this, a critical incident pump power of approximately 582 W can be calculated. Given this pump power, laser output of at most 483 W can be expected from the fiber. The estimate of output power becomes arbitrarily high for multimode fibers, which are comparable to the large core, multimode silica fibers that emit in the kW power regime.

Example 4: Determination of Sublimation Enthalpies

A modified version of a reported thermogravimetric analysis (TGA) was used to determine the $\Delta_{sub}H$ and $\Delta_{vap}H$ of Cp₂Cr and EtCp₂Cr, respectively (Gillan, et al., Chem. Mater., 1997, 9, 796-806).

Relationship Between Mass Loss and Vapor Pressure

The Langmuir equation can be used to relate the kinetics of evaporation from a surface to the vapor pressure:

$$\frac{dm}{dt} = (P_g - P_P)\sqrt{\frac{M_w}{2\pi RT}}$$

where dm/dt is the rate of mass loss (which can be measured by TGA), $M_w$ is the molecular weight, $P_g$ is the vapor pressure of the liquid/solid at a given temperature T, and $P_P$ is the partial pressure of the vapor in the gas phase above the liquid/solid. There are essentially two limits to the $(P_g-P_P)$ term in the above equation:

If the process were carried out in a sealed container, then equilibrium would be reached and $P_g=P_P$, making $(P_g-P_P)=0$ to result in no net loss of mass from the liquid/solid surface (dm/dt=0).

If the process were carried out in a dynamic vacuum, then equilibrium would not be established, any evaporated species would be carried away from the surface immediately ($P_P=0$), and a maximum loss of mass would occur. The result is $(P_g-P_P)=P_g$.

In the flowing conditions of the TGA, neither of these two conditions is met and the system can be described as an intermediate between a sealed system and vacuum. If we let:

$$(P_g - P_P) = \alpha P_g \text{ where } 0 \le \alpha \le 1$$

Then:

$$\frac{dm}{dt} = \alpha P_g \sqrt{\frac{M_w}{2\pi RT}}$$

Thus, the vapor pressure of a substance at a given T can be related to the rate of mass loss at that temperature via:

$$P_g = \frac{dm}{dt}\frac{1}{\alpha}\sqrt{\frac{2\pi RT}{M_w}}$$

In SI units, dm/dt is expressed in kgm$^{-2}$s$^{-1}$. Therefore, it is important to either control the surface area of the sample during the experiment or keep it constant throughout a series of experiments. This is best accomplished using a pinhole method.

Container Design for Air Sensitive Materials

Figure 7:
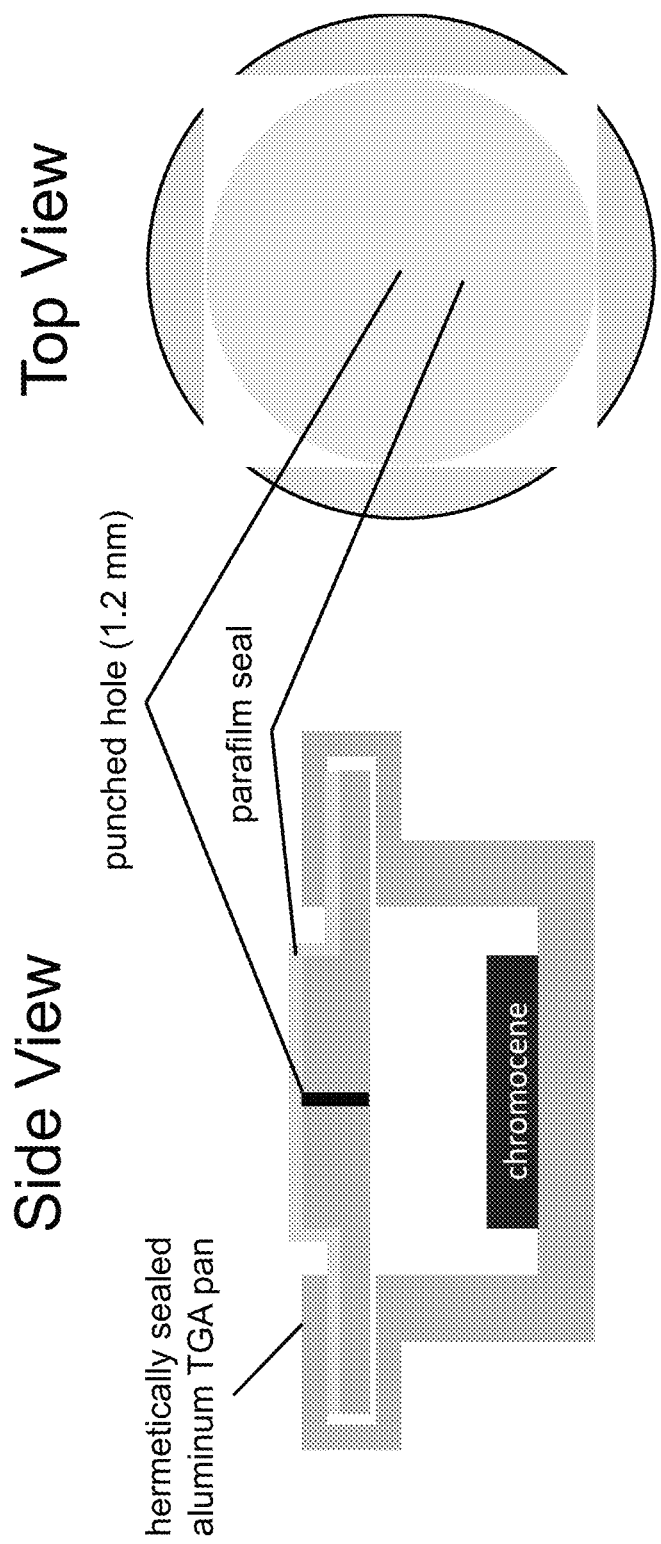
FIG. 7 is a schematic of the container design used for thermogravimetric analysis (TGA) of air sensitive materials.

Even though TGA can be performed under nitrogen flow, the air sensitivity of chromocene derivatives requires that the samples do not contact air at any point before or during the analysis. To address this issue, a sample cell was designed using a modified hermitically sealed TGA plan (FIG. 7). The top of the pan is punched with a 1.2 mm hole to control the surface area for evaporation. The chromocene derivative can be loaded into an aluminum bottom pan, which is sealed to the top lid in a glovebox with a thin parafilm layer forming a temporary seal. This design allows the sample to be transferred from the glove box to the TGA without exposure to air. Once in the TGA, the instrument is purged for 15 min before heating. As the sample is heated under nitrogen flow in the instrument during the analysis, the parafilm melts around 60° C., allowing the chromocene to exit the pan and the mass loss to begin in an inert atmosphere.

Calibration: Determining $\alpha$

In order to determine $P_g$ (T) and $\Delta_{sub}H/\Delta_{vap}H$ for substances, the value of a must be determined using a substance with a known $P_g(T)$ function. The Antoine equation is commonly used expresses the vapor pressure of a substance as a function of temperature as:

$$\log_{10}P_g(T) = A - \frac{B}{T+C}$$

where T is the temperature, and A, B, and C are parameters associated with a given substance.

With these parameters known from reference data, the vapor pressure can be determined. In a calibration experiment in TGA, the rate of mass loss of benzoic acid was measured at various temperatures. The known vapor pressure from the Antoine equation at these temperatures was then plotted against that predicted by the Langmuir equation:

$$P_g(T) = \frac{1}{\alpha}\frac{dm}{dt}\sqrt{\frac{2\pi RT}{M_w}}$$

Thus, the slope of a plot of $P_g$(T) versus $$\frac{dm}{dt}\sqrt{\frac{2\pi RT}{M_w}}$$

is $1/\alpha$.

Analysis of Unknown Materials

Once $\alpha$ is known, it can be used to determine the vapor pressure of unknown materials. The rate of mass loss at different temperatures is measured and converted to vapor pressure as a function of temperature. These data can then be used to determine $\Delta_{sub}H/\Delta_{vap}H$. Let $T_{vap}$ be the standard boiling/sublimation point of the liquid/solid at a pressure of P°=1 bar. Combining the Clausius-Clapeyron and Langmuir equations:

$$\ln\left[\sqrt{T}\frac{dm}{dt}\right] = -\frac{\Delta_{vap}\overline{H}}{RT} + \frac{\Delta_{vap}\overline{H}}{RT_{vap}} + \ln P° - \ln\left[\frac{1}{\alpha}\sqrt{\frac{2\pi R}{M_w}}\right]$$

Figure 8:
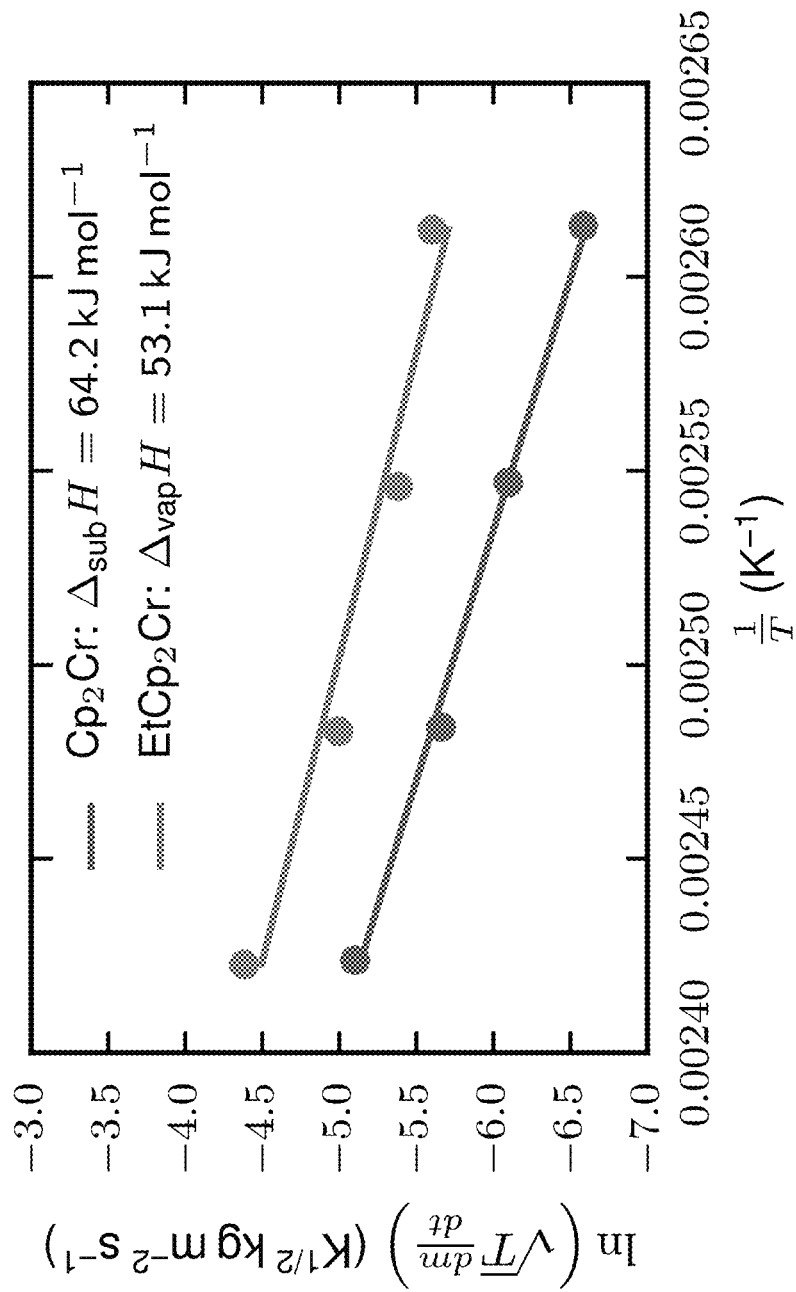
FIG. 8 is a chart plotting $$\ln\left[\sqrt{T}\frac{dm}{dt}\right]$$

Thus a plot of $$\ln\left[\sqrt{T}\frac{dm}{dt}\right]$$

versus 1/T will have a slope of $\Delta_{vap}$ H/R. This analysis was performed to result in values of $\Delta_{sub}$H=64.2 kJ/mol for Cp$_2$Cr and $\Delta_{vap}$ H=53.1 kJ/mol for EtCp$_2$Cr (FIG. 8). iPrCp$_2$Cr was found to be too reactive for this technique. Note that Cp$_2$Cr melts around 170° C., which may affect higher temperature volatility ranking.

Example 5: Calculation of Theoretical Output Power

Lasing operation is expected to reduce the heat load but at a certain point of pumping the situation will become unstable. A small increase in temperature will lead to an increased rate of non-radiative relaxation which in turn leads to decreased lasing and greater temperature rise. This trend can continue until all laser action ceases. An approximate calculation of the above-threshold pump power at which lasing ceases can be done by recalling that $$P_{out} = S(P_{in} - P_{th})$$

Where $P_{out}$ is the laser output power, $P_{in}$ is the laser pump power, $P_{th}$ is the laser threshold power and S is the slope efficiency. For a four-level laser, $$P_{th} = \kappa(P_{sat})$$

Where $P_{sat}$ is the saturation power dependent only on the properties of the $Cr^{2+}$ ions and $\kappa$ is a proportionality constant that depends upon details of a specific laser resonator setup. The saturation power is then defined as, $$P_{sat}(T) = \frac{Ah\nu_e}{(\sigma_e + \sigma_a)\tau(T)}$$

Where A is the area of the pump beam, $\sigma_a$ is the absorption cross-section of the materials, and $\sigma_e$ is the emission cross-section of the material. Additionally, h is Planck's constant, $\nu_e$ is the frequency of the emitted photon, $\sigma_e$ is the emission cross section and $\tau(T)$ is the emission lifetime as a function of temperature. Note that for Cr:ZnSe, as pump power increases, $\tau$ is expected to rapidly decrease as the temperature goes above 300 K. That means that $P_{sat}$ and $P_{th}$ increase. Eventually output power will no longer increase with increasing pump power at a critical pump power so that $$0 = \frac{dP_{out}}{dP_{in}} = S\left(1 - \frac{dP_{th}}{dP_{in}}\right)$$

where the right side of the above equation comes from differentiating Eq. (1) with respect to input power. Solving for $dP_{th}/dP_{in}$ and using $$\frac{dP_{th}}{dP_{in}} = \kappa \frac{dP_{sat}}{dT}\frac{dT}{dP_{in}}$$

affords $$\frac{\kappa Ah\nu_e}{\sigma_e}\frac{d(1/\tau)}{dT}\frac{dT}{dP_{in}} = 1$$

Measured lifetimes from Deloach et al (IEEE Journal of Quantum Electronics 1996, 32) were fit to an 8$^{th}$ order polynomial for convenience in order to calculate the temperature derivative of 1/T.

The $dT/dP_{in}$ factor is the change in the core temperature as a function of input power assuming uniform cooling on the exterior of the fiber. A COMSOL model was developed in order to predict the heat load on the fiber without energy extraction, estimating the thermal load under a worst case scenario. The COMSOL model predicts a value of $dT/dP_{in}=H=2.14$ K/W for diamond cladding and $dT/dP_{in}=H=237.48$ K/W for silica cladding. Below the lasing threshold, $dT/dP_{in}=H$. Above the threshold, there is less heating since there is less chance for non-radiative relaxation; so $dT/dP_{in}=(1-S)$. FIG. 9 shows a plot of $dP_{th}/dP_{in}$ versus temperature for an exemplary Cr:ZnSe, 15 μm core, diamond clad fiber laser.

The above calculations afford a solution to the above equation at a critical temperature of ~359 K for a diamond clad Cr:ZnSe. The critical change in temperature $\Delta T_{crit} = T_{crit} - T_o$ where $T_o$ is the starting temperature and the critical power is given in terms of input power by $$\Delta T_{crit} = \frac{dT}{dP_{in}}P_{th} + (1-S)\frac{dT}{dP_{in}}(P_{crit} - P_{th}) \qquad (S7)$$

Solving this equation for critical incident pump power, $P_{crit}$ gives $$P_{crit} = \frac{\Delta T_{crit} - SP_{th}\frac{dT}{dP_{in}}}{(1-S)\frac{dT}{dP_{in}}} \qquad (S8)$$

If a best case scenario for a 15 μm diameter waveguide clad in diamond, S=0.83 (quantum limit) is assumed, $P_{th}=0.1$ W which is the best reported for Cr:ZnSe waveguides, $\Delta T_{crit}=106$ K and $dT/dP_{in}=2.14$ K/W, a critical incident pump power of approximately 180 W can be calculated. Given this pump power and quantum limited efficiency, a maximum of 149 W of laser output from the fiber can be expected. Note that this is the critical power for the front region of the waveguide; regions further downstream will reach critical temperature at slightly higher powers. Additionally, this does not take into account the damage threshold of the material. If a damage threshold of 1 MW/cm² into is assumed, the maximum incident pump power should be on the order of 10 W with an output laser power of 8.3 W. Additionally, the best case scenario for an 15 μm diameter waveguide clad in silica can be estimated, S=0.83 (quantum limit), $P_{th}=0.01$ W, which is the best reported for Cr:ZnSe waveguides, $\Delta T_{crit}=12.1$ K and $dT/dP_{in}=237.48$ K/W, a critical incident pump power of approximately 0.25 W can be calculated. For the case of the Cr:ZnSe fiber clad with silica, a good estimate of the slope of the laser is not available. Considering that only basic indications of lasing have been observed, these figures are likely to be much worse. For instance, the slope efficiency is changed to 1%, the critical power is decreased to <50 mW.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

The invention claimed is:

1. An optical fiber comprising an external silica cladding and a transition metal doped chalcogenide core.

2. The optical fiber of claim 1, wherein the transition metal is selected from the group consisting of chromium, iron, and manganese.

3. The optical fiber of claim 1, wherein the transition metal is chromium.

4. The optical fiber of claim 1, wherein the concentration of transition metal along the length of the core is substantially uniform.

5. The optical fiber of claim 1, wherein the chalcogenide is a II-VI semiconductor.

6. The optical fiber of claim 1, wherein the chalcogenide is selected from the group consisting of ZnSe, ZnS, ZnTe, CdSe, CdS, CdTe, HgSe, HgS, and HgTe.

7. The optical fiber of claim 1, wherein the chalcogenide is ZnSe.

8. The optical fiber of claim 1, wherein the cladding and the core have a substantially semi-cylindrical cross section.

9. The optical fiber of claim 1, wherein the cladding and the core have a substantially D-shaped cross section.

10. The optical fiber of claim 1, wherein the cladding and the core have a substantially cylindrical cross section.

11. The optical fiber of claim 10, wherein the diameter of the core is between 1 and 1000 μm.

12. The optical fiber of claim 10, wherein the diameter of the core is about 15 μm.

13. A laser comprising the optical fiber of claim 1.

* * * * *